(12) United States Patent
Shimamoto et al.

(10) Patent No.: US 11,535,243 B2
(45) Date of Patent: Dec. 27, 2022

(54) REMOTE PARKING SYSTEM

(71) Applicant: HONDA MOTOR CO., LTD., Tokyo (JP)

(72) Inventors: Gaku Shimamoto, Saitama (JP); Junpei Noguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 186 days.

(21) Appl. No.: 17/026,630

(22) Filed: Sep. 21, 2020

(65) Prior Publication Data
US 2021/0086762 A1   Mar. 25, 2021

(30) Foreign Application Priority Data
Sep. 24, 2019   (JP) .............................. JP2019-173351

(51) Int. Cl.
*B60W 30/06*   (2006.01)
*G08G 1/14*   (2006.01)

(52) U.S. Cl.
CPC ............ *B60W 30/06* (2013.01); *G08G 1/142* (2013.01); *B60W 2552/50* (2020.02); *B60W 2556/55* (2020.02)

(58) Field of Classification Search
None
See application file for complete search history.

(56) References Cited

U.S. PATENT DOCUMENTS

| 10,773,715 | B2 | 9/2020 | Yamanaka et al. |
| 11,267,394 | B2* | 3/2022 | Oikawa ................. G05D 1/0236 |
| 2015/0088360 | A1* | 3/2015 | Bonnet ................. B62D 15/027 |
| | | | 701/23 |
| 2016/0272244 | A1 | 9/2016 | Imai et al. |

(Continued)

FOREIGN PATENT DOCUMENTS

| CN | 109455177 A | 3/2019 |
| CN | 109466505 A | 3/2019 |

(Continued)

OTHER PUBLICATIONS

He, Accuracy Analysis of the Two-Reference-Node Angle-of-Arrival Localization System, Mar. 23, 2015, IEEE (Year: 2015).*

(Continued)

*Primary Examiner* — Christian Chace
*Assistant Examiner* — Scott R Jagolinzer
(74) *Attorney, Agent, or Firm* — Armstrong Teasdale LLP

(57) ABSTRACT

A remote parking system includes: a terminal configured to transmit a ranging signal; plural reception units provided with a reception surface to receive the ranging signal and configured to detect an arrival direction of the ranging signal with respect to the reception surface; and a control device configured to acquire a distance from the terminal to a vehicle based on the arrival direction of the ranging signal and a reference posture of each of the reception units and to move the vehicle toward a parking position based on an operation input to the terminal in a case where the control device determines that the acquired distance from the ter- (Continued)

minal to the vehicle is equal to or less than a prescribed threshold. The control device is configured to cause the terminal to display an intensity of the ranging signal received by at least one of the reception units.

5 Claims, 24 Drawing Sheets

(56) References Cited

U.S. PATENT DOCUMENTS

| | | | |
|---|---|---|---|
| 2017/0344001 A1* | 11/2017 | Mukai | B60W 30/06 |
| 2018/0082588 A1 | 3/2018 | Hoffman, Jr. et al. | |
| 2018/0105167 A1* | 4/2018 | Kim | B60W 50/085 |
| 2018/0118163 A1* | 5/2018 | Murakami | B60R 25/01 |
| 2018/0148094 A1 | 5/2018 | Mukaiyama | |
| 2018/0267527 A1* | 9/2018 | Rubin | G05D 1/0276 |
| 2019/0025816 A1* | 1/2019 | Vogt | B60W 50/14 |
| 2019/0152472 A1* | 5/2019 | Aksyutina | B60W 30/06 |
| 2019/0202348 A1* | 7/2019 | Elangovan | B60Q 1/50 |
| 2019/0220001 A1* | 7/2019 | Lavoie | B62D 1/00 |
| 2019/0227539 A1* | 7/2019 | Golgiri | G05D 1/0016 |
| 2019/0232953 A1 | 8/2019 | Suzuki et al. | |
| 2019/0310624 A1* | 10/2019 | Bettger | G05D 1/0016 |
| 2019/0383627 A1* | 12/2019 | Nangeroni | B60W 50/0098 |
| 2020/0307555 A1* | 10/2020 | Van Wiemeersch | G05D 1/0022 |
| 2021/0053621 A1 | 2/2021 | Mukaiyama | |

FOREIGN PATENT DOCUMENTS

| | | |
|---|---|---|
| CN | 109885064 A | 6/2019 |
| DE | 102012200625 A1 | 7/2013 |
| JP | 2002175591 A | 6/2002 |
| JP | 2009208741 A | 9/2009 |
| JP | 2015089733 A | 5/2015 |
| JP | 2018086920 A | 6/2018 |
| WO | 2018066069 A1 | 4/2018 |
| WO | 2018235273 A1 | 12/2018 |
| WO | 2019058611 A1 | 3/2019 |

OTHER PUBLICATIONS

First Notification of Office Action for Patent Application CN 202011007216.2; dated Apr. 22, 2022; 22 pp.

Notice of Reasons for Refusal for Patent Application JP 2019-173351 dated May 10, 2022; 7 pp.

* cited by examiner

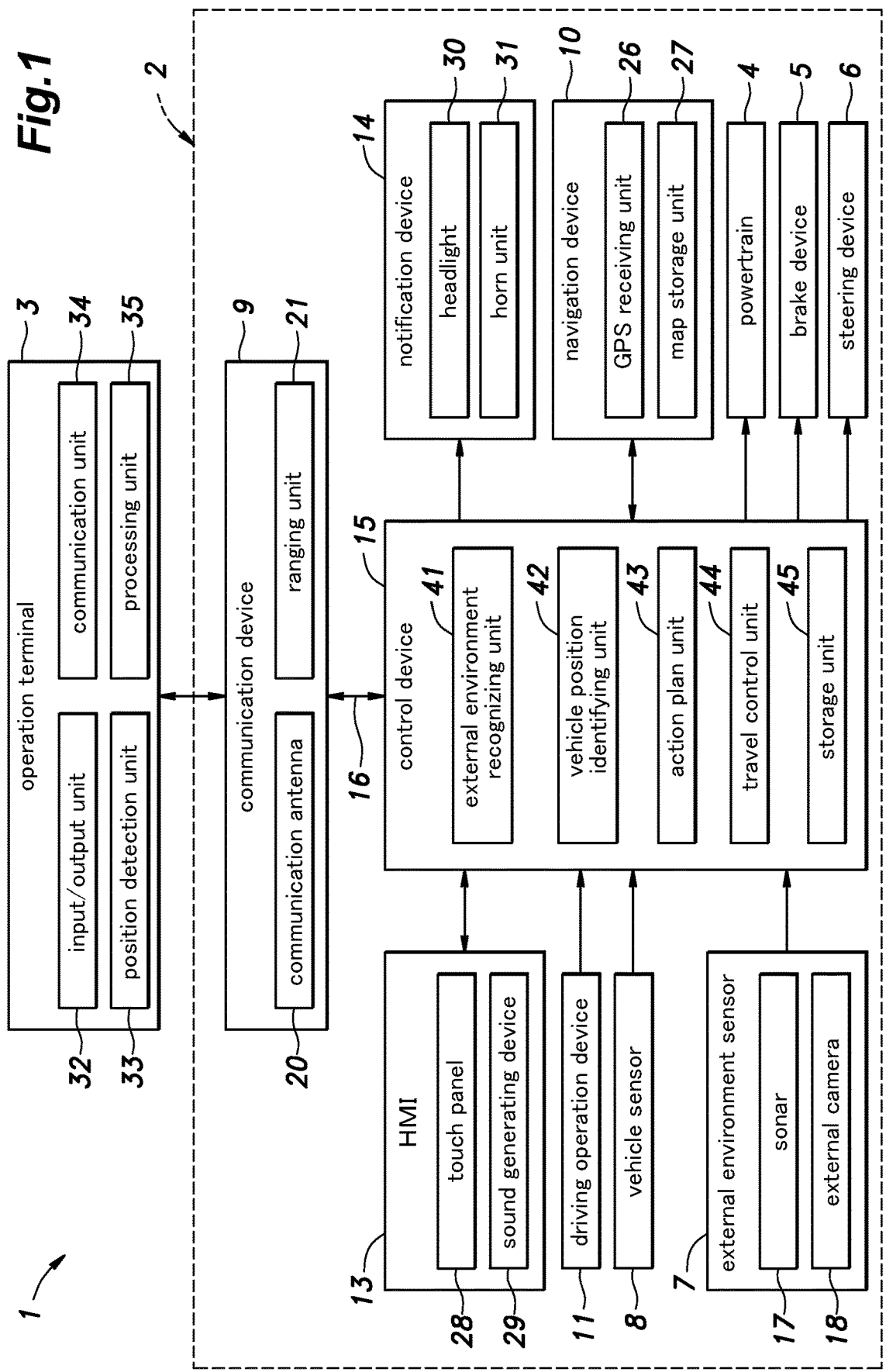

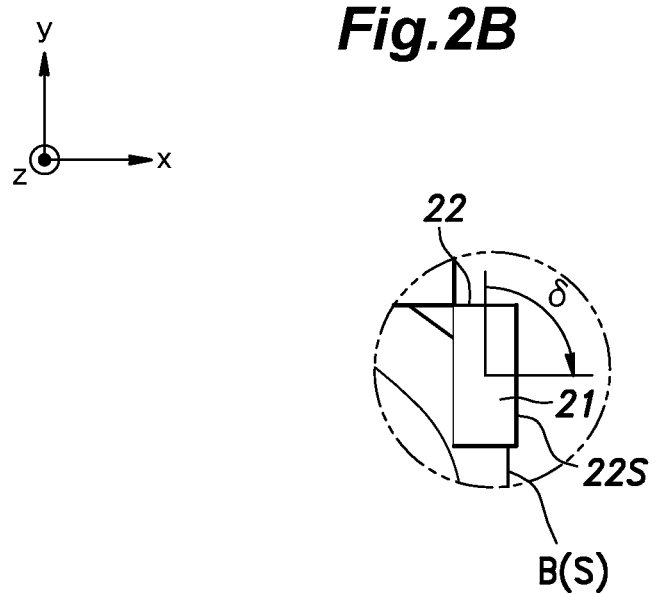

*Fig.7A* reference table

| unit ID | reference position P [mm] | | | reference angle $\delta$ [deg] | initial angle $\phi$ [deg] | initial intensity $I_0$ [arb.unit] |
|---|---|---|---|---|---|---|
| | x | y | z | | | |
| 1 | −750 | 2000 | 200 | 0 | −30.0 | 0.5 |
| 2 | 750 | 2000 | 200 | 0 | 30.0 | 0.5 |
| ⋮ | ⋮ | ⋮ | ⋮ | ⋮ | ⋮ | ⋮ |

*Fig.7B* correction table

| unit ID | reception intensity I [arb. unit] | intensity determination result | arrival angle θ [deg] | correction angle ε [deg] | correction determination result |
|---|---|---|---|---|---|
| 1 | 0.49 | ○ | −29.9 | +0.01 | ○ |
| 2 | 0.51 | ○ | 30.1 | −0.01 | ○ |
| ⋮ | ⋮ | ⋮ | ⋮ | ⋮ | ⋮ |

*Fig.14*
| quality of ranging state | (A) | (B) | (C) |
|---|---|---|---|
| high | 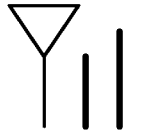 |  |  |
| medium |  |  |  |
| low |  |  | 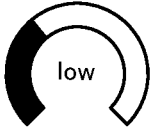 |

REMOTE PARKING SYSTEM

TECHNICAL FIELD

The present invention relates to a remote parking system for parking a vehicle according to a remote operation from a terminal.

BACKGROUND ART

A parking assist system known in the art executes parking assistance by moving a vehicle based on an instruction from a portable terminal (for example, JP2015-89733A). In this parking assist system, the vehicle moves in a case where a distance between the portable terminal and the vehicle is within a prescribed range (for example, within a few meters) where the user can check the safety of the vehicle and its vicinity. The distance between the portable terminal and the vehicle is measured by exchanging ultrasonic waves between two onboard communication units provided at front and rear ends of the vehicle and a terminal communication unit of the portable terminal. The vehicle can move when the distance between the portable terminal and the vehicle (either of the two onboard communication units) is equal to or less than the upper limit.

In the parking assist system disclosed in JP2015-89733A, the distance between the portable terminal and the vehicle is measured by making communication between a terminal (portable terminal) and antennas (onboard communication units). If a ranging signal from the terminal to the antennas is disturbed by the surrounding environment, the communication between the terminal and the antennas may become unstable. In such a case, it is preferable that the user can move the terminal to a place where the communication between the terminal and the antennas is stable and the distance between the portable terminal and the vehicle can be easily measured.

SUMMARY OF THE INVENTION

In view of such a problem of the prior art, a primary object of the present invention is to provide a remote parking system that measures a distance between a terminal and a vehicle by making communication between the terminal and reception units, executes remote parking of the vehicle by using the terminal when the terminal is present within a prescribed distance from the vehicle, and easily moves the terminal to a place where the communication between the terminal and the reception units is stable and the distance between the terminal and the vehicle can be easily measured.

To achieve such an object, one embodiment of the present invention provides a remote parking system (1) for parking a vehicle (S) at a prescribed parking position by a remote operation. The remote parking system includes: a terminal (3) configured to be carried by a user, to accept an operation input by the user, and to transmit a ranging signal for measuring a distance from the terminal to the vehicle; plural reception units (21) attached to an outer edge of the vehicle with a reference posture, provided with a reception surface (22S) to receive the ranging signal from the terminal, and configured to detect an arrival direction of the ranging signal with respect to the reception surface; and a control device (15) configured to acquire the distance from the terminal to the vehicle based on the arrival direction of the ranging signal detected by at least two of the reception units and the reference posture of each of the reception units, and to move the vehicle toward the parking position based on the operation input to the terminal in a case where the control device determines that the acquired distance from the terminal to the vehicle is equal to or less than a prescribed threshold, wherein the control device is configured to cause the terminal to display an intensity of the ranging signal received by at least one of the reception units.

According to this arrangement, the user can recognize the intensity of the ranging signal based on a display of the terminal, and thus move the terminal while checking the display of the terminal. Accordingly, the user can easily move the terminal to a place where the intensity of the ranging signal is high, the communication between the terminal and the reception units is stable, and the distance between the terminal and the vehicle can be easily measured.

In the above arrangement, preferably, the control device is configured to cause the terminal to display a position of the at least one of the reception units and the intensity of the ranging signal received by the at least one of the reception units.

According to this arrangement, the user can recognize the position of the reception unit which receives the ranging signal with a low intensity. Accordingly, the user can increase the intensity of the ranging signal by approaching the reception unit which receives the ranging signal with a low intensity, so that the communication between the terminal and the reception units can be further stable.

In the above arrangement, preferably, when the intensity of the ranging signal received by at least two of the reception units is equal to or greater than a prescribed intensity threshold, the control device permits a movement of the vehicle toward the parking position.

According to this arrangement, the distance from the terminal to the vehicle is calculated based on the ranging signal received by at least two of the reception units, so that the accuracy of the calculated distance can be improved.

In the above arrangement, preferably, in a case where the intensity of the ranging signal received by at least two of the reception units is not equal to or greater than the prescribed intensity threshold, the control device waits until the intensity of the ranging signal received by at least two of the reception units becomes equal to or greater than the prescribed intensity threshold, and when the intensity of the ranging signal received by at least two of the reception units becomes equal to or greater than the prescribed intensity threshold, the control device permits the movement of the vehicle toward the parking position.

According to this arrangement, the control device waits until the intensity of the ranging signal received by at least two of the reception units becomes equal to or greater than the intensity threshold, and thereafter permits the movement of the vehicle when the intensity of the ranging signal received by at least two of the reception units becomes equal to or greater than the intensity threshold. Accordingly, the convenience of the remote parking system can be improved as compared with a case where the remote parking is canceled when the intensity of the ranging signal received by less than two of the reception units is equal to or greater than the intensity threshold.

In the above arrangement, preferably, the control device is configured to acquire a direction of the terminal with respect to the vehicle and the distance from the terminal to the vehicle based on the ranging signal received by each of the reception units, to calculate a moving distance of the vehicle based on the operation input to the terminal, and to stop the vehicle and cause the terminal to display a warning in a case where the terminal is present in a moving direction of the vehicle and the distance from the terminal to the vehicle is equal to or less than the moving distance.

According to this arrangement, in a case where the terminal is present in the moving direction of the vehicle and the distance from the terminal to the vehicle is equal to or less than the moving distance, the vehicle is stopped and the warning is displayed on the terminal. Accordingly, the vehicle can be prevented from coming into contact with the user holding the terminal, so that the safety of the vehicle can be enhanced. Further, by displaying the warning on the terminal, the user can easily recognize that the user needs to evacuate.

In the above arrangement, preferably, the vehicle includes a notification device (14) configured to give a notification to an outside of the vehicle by at least one of a sound and light, and the control device is configured to acquire a direction of the terminal with respect to the vehicle and the distance from the terminal to the vehicle based on the ranging signal received by each of the reception units, to calculate a moving distance of the vehicle based on the operation input to the terminal, and to stop the vehicle and activate the notification device in a case where the terminal is present in a moving direction of the vehicle and the distance from the terminal to the vehicle is equal to or less than the moving distance.

According to this arrangement, the notification device gives the notification to the user, and thus the user can easily recognize that the user needs to evacuate. Accordingly, the safety of the vehicle can be enhanced.

In the above arrangement, preferably, the notification device includes at least one of a light (30) and a sound device (31).

According to this arrangement, the notification (warning) can be easily given to the user.

In the above arrangement, preferably, the control device is configured to estimate a position of the vehicle after the movement of the vehicle based on the operation input to the terminal, and to cause the terminal to display an area where the ranging signal from the terminal can be received at the position of the vehicle after the movement of the vehicle.

According to this arrangement, the user can easily recognize the area where the distance from the terminal to the vehicle can be measured at the position of the vehicle after the movement of the vehicle. Accordingly, the user can move the terminal to a position where the distance from the terminal to the vehicle can be measured (namely, a position where the remote parking can be executed) according to the movement of the vehicle.

Thus, according to the above arrangements, it is possible to provide a remote parking system that measures a distance between a terminal and a vehicle by making communication between the terminal and reception units, executes remote parking of the vehicle by using the terminal when the terminal is present within a prescribed distance from the vehicle, and easily moves the terminal to a place where the communication between the terminal and the reception units is stable and the distance between the terminal and the vehicle can be easily measured.

BRIEF DESCRIPTION OF THE DRAWING(S)

FIG. 1 is a functional block diagram of a remote parking system;

FIG. 2B is an enlarged view of a part surrounded by a two-dot chain circle in FIG. 2A;

FIG. 7A is an explanatory diagram showing a reference table;

FIG. 7B is an explanatory diagram showing a correction table;

Figure 13A:
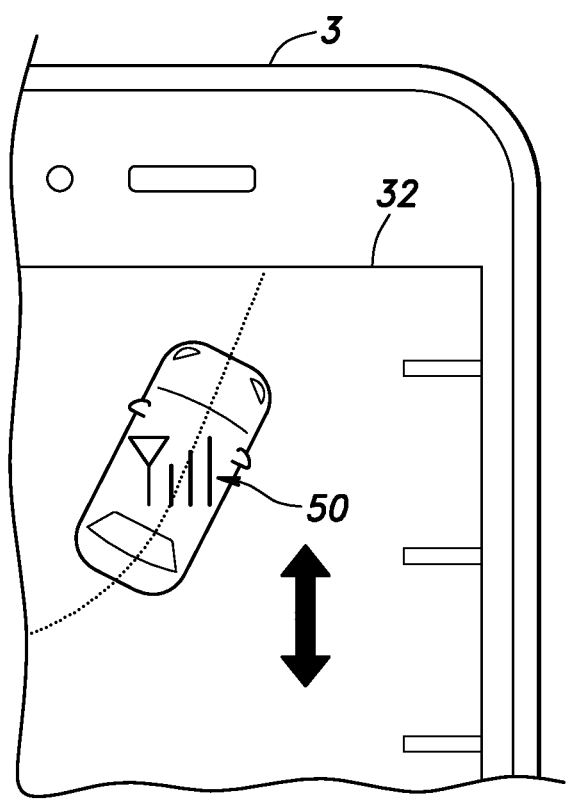
Figure 13B:
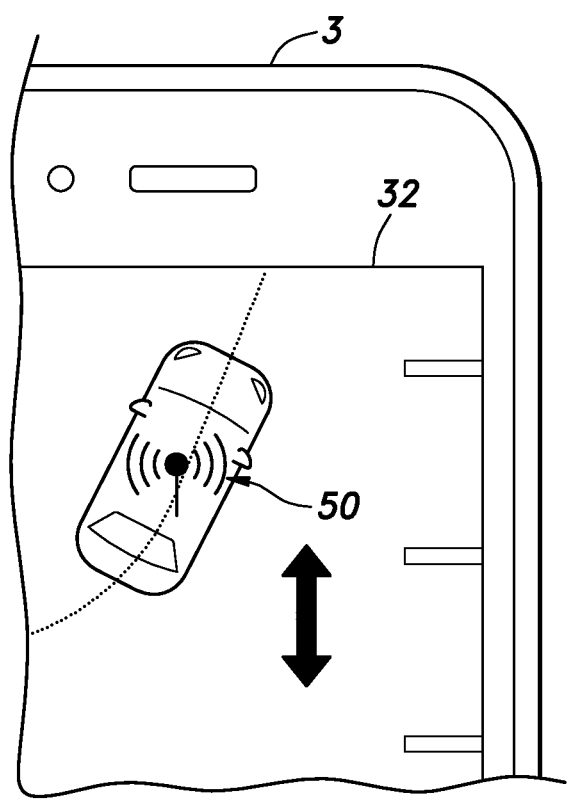
Figure 13C:
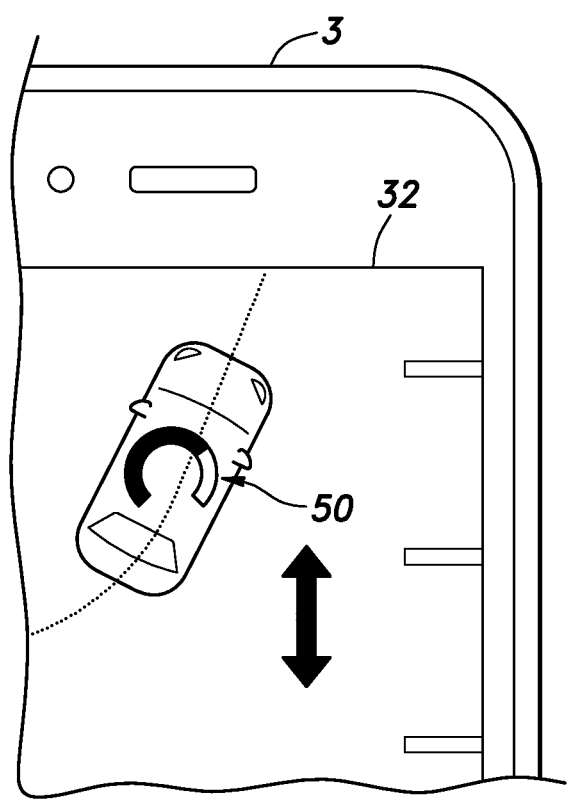
Figure 15:
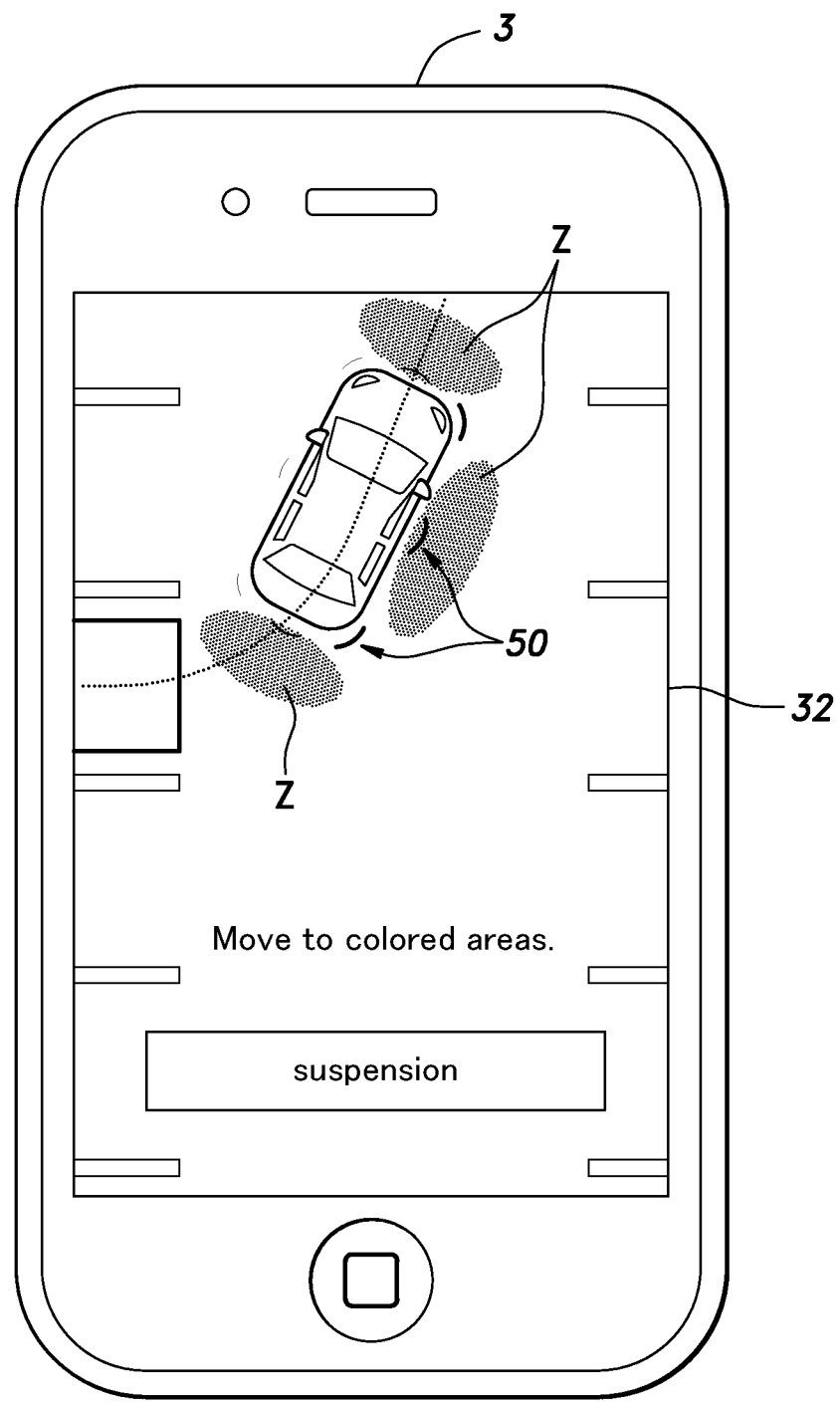
Figure 16:
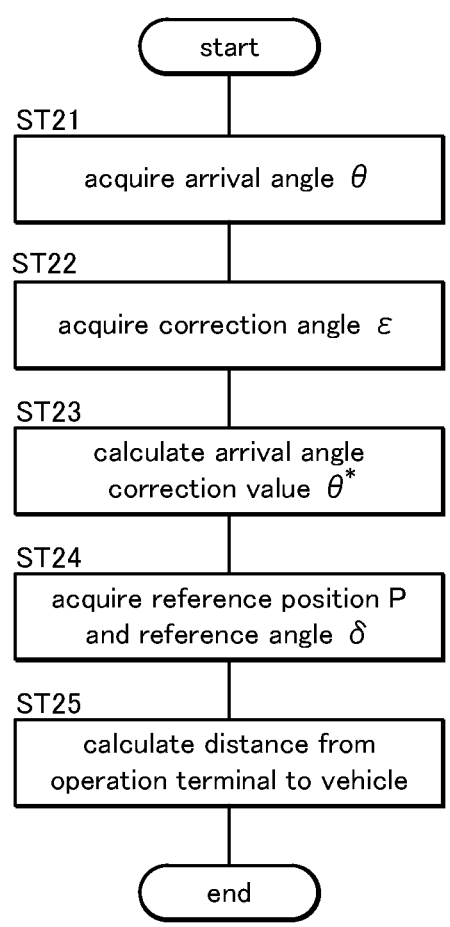

FIG. 13A is an explanatory diagram showing a second modification of the screen displayed on the operation terminal during the moving processing, FIG. 13B is an explanatory diagram showing a third modification of the screen displayed on the operation terminal during the moving processing, FIG. 13C is an explanatory diagram showing a fourth modification of the screen displayed on the operation terminal during the moving processing;

FIG. 14 is an explanatory diagram showing icons when the quality of the ranging state is displayed at three levels of "high", "medium", and "low";

FIG. 15 is an explanatory diagram showing the stably ranging areas in the screen displayed on the operation terminal during the moving processing;

FIG. 16 is a flowchart of ranging processing; and

Figure 17:
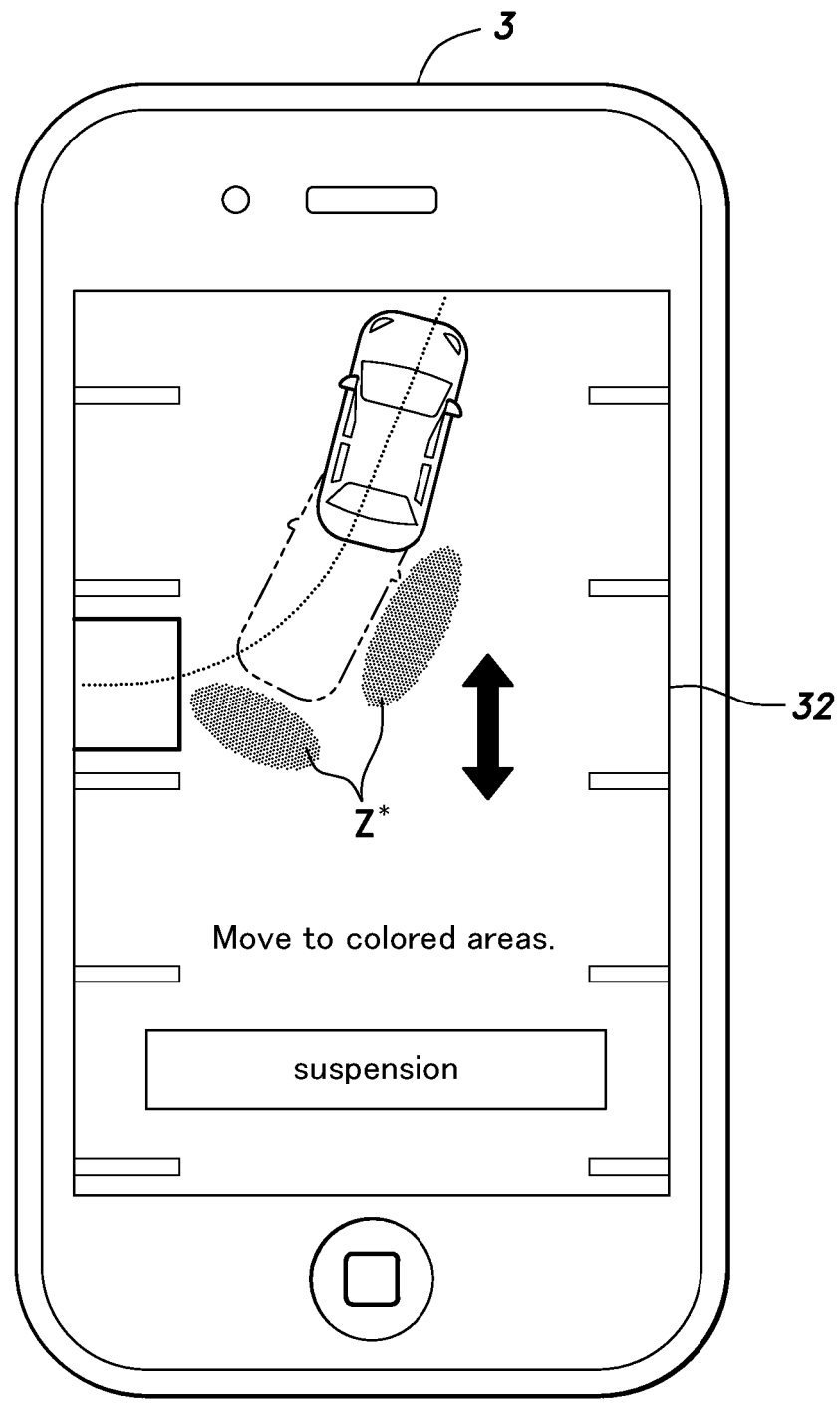

FIG. 17 is an explanatory diagram showing a modification of the screen displayed on the operation terminal during the moving processing.

DESCRIPTION OF THE PREFERRED EMBODIMENT(S)

In the following, a remote parking system 1 according to an embodiment of the present invention is described with reference to the drawings.

As shown in FIG. 1, the remote parking system 1 includes a vehicle system 2 mounted on a vehicle S and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, an HMI 13, a notification device 14, and a control device 15. The above components of the vehicle system 2 are connected by communication means such as a controller area network 16 (CAN) so that a signal can be transmitted between the above components.

The powertrain 4 is configured to apply a driving force to the vehicle S. The powertrain 4 includes a power source and a transmission, for example. The power source includes at least one of an internal combustion engine such as a gasoline engine and a diesel engine and an electric motor. The brake device 5 is configured to apply a brake force to the vehicle S. For example, the brake device 5 includes a brake caliper configured to press a brake pad against a brake rotor and an electric cylinder configured to supply an oil pressure to the brake caliper. The brake device 5 includes a parking brake device configured to restrict rotations of wheels via wire cables. The steering device 6 is configured to change a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 is configured to detect electromagnetic waves, sound waves, and the like from the periphery of the vehicle S to detect an object outside the vehicle S. The external environment sensor 7 includes sonars 17 and external cameras 18. The external environment sensor 7 may further include a millimeter wave radar or a laser lidar. The external environment sensor 7 outputs a detection result to the control device 15.

Each sonar 17 consists of the so-called ultrasonic sensor. Each sonar 17 emits ultrasonic waves around the vehicle S and captures the ultrasonic waves reflected by the object to detect a position (distance and direction) of the object. Plural sonars 17 are provided at a rear part and a front part of the vehicle S, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right surfaces of the vehicle S. That is, the vehicle S is provided with six pairs of sonars in total.

The external cameras 18 are configured to capture images around the vehicle S. Each external camera 18 consists of a digital camera using a solid imaging element such as a CCD or a CMOS, for example. The external cameras 18 include a front camera configured to capture an image of the front of the vehicle S and a rear camera configured to capture an image of the rear of the vehicle S.

The vehicle sensor 8 includes a vehicle speed sensor configured to detect the vehicle speed of the vehicle S, an acceleration sensor configured to detect the acceleration of the vehicle S, a yaw rate sensor configured to detect the angular velocity around a vertical axis of the vehicle S, and a direction sensor configured to detect the direction of the vehicle S. For example, the yaw rate sensor consists of a gyro sensor.

The communication device 9 is configured to mediate wireless communication between the control device 15 and the operation terminal 3. The control device 15 communicates with the operation terminal 3 carried by a user via the communication device 9 based on Bluetooth, which is a standard for short-distance wireless communication. In this way, by making communication based on Bluetooth, a general communication device such as a smartphone or a mobile phone can be used as the operation terminal 3.

The communication device 9 includes a communication antenna 20 (transmission antenna) and plural ranging units 21 (plural reception units). The communication antenna 20 consists of a transmission/reception antenna configured to mediate wireless data exchange (for example, wavelength thereof is 12 cm) between the control device 15 and the operation terminal 3 based on Bluetooth, and is fixed to the vehicle body B. The communication antenna 20 may be fixed inside a vehicle cabin or an engine compartment.

Each ranging unit 21 is configured to receive a ranging signal based on Bluetooth from the operation terminal 3 carried by the user and to measure (range) the distance from the operation terminal 3 to the vehicle S. Each ranging unit 21 is provided with unit ID (sensor ID). For example, the ranging signal may be an advertisement signal based on a Bluetooth Low Energy (BLE) standard. The advertisement signal is a signal transmitted from the operation terminal 3 that can execute remote parking of the vehicle S so as to notify the surrounding device (for example, the vehicle S) of the existence of the operation terminal 3 and thus establish a connection with the vehicle S.

Figure 2A:
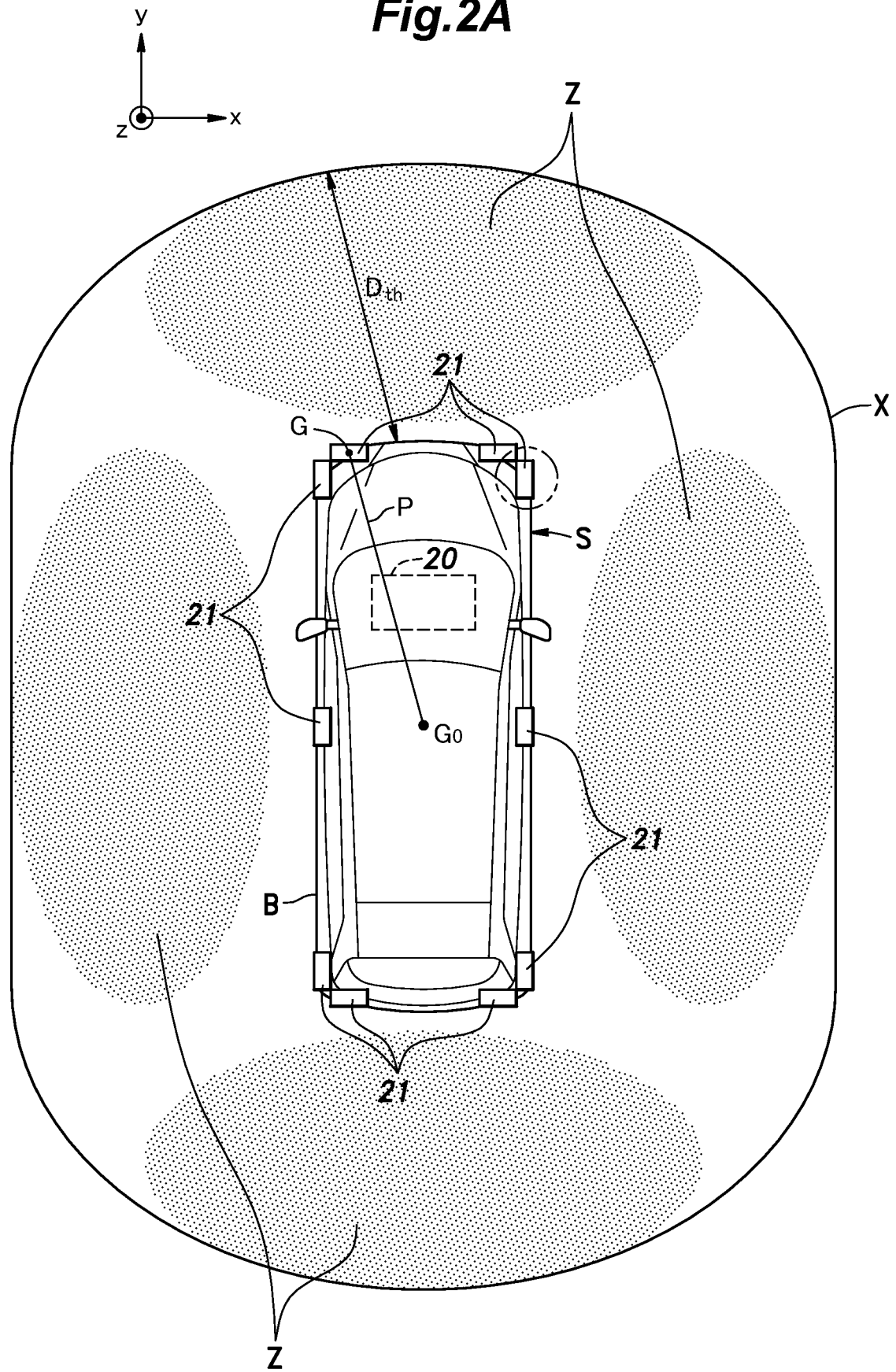
FIG. 2A is a plan view showing the arrangement of ranging units on a vehicle body and stably ranging areas.

As shown in FIG. 2A, the ranging units 21 are provided along an outer edge of the vehicle S (vehicle body B). The ranging units 21 are provided at least on left and right front edges and left and right rear edges of the vehicle S (vehicle body B). Thus, the ranging signal from the operation terminal 3 present in front of or behind the vehicle S can be received by the ranging units 21, and thus the area where the ranging signal can be stably received by the ranging units 21 can be enlarged as compared with a case where the ranging units 21 are provided only on a front surface or a rear surface of the vehicle S.

In the present embodiment, the ranging units 21 are respectively provided at both lateral ends on a front surface of the vehicle body B, at both lateral ends on a rear surface of the vehicle body B, at both fore-and-aft ends and a fore-and-aft center part on a left surface of the vehicle body B, and at both fore-and-aft ends and a fore-and-aft center part on a right surface of the vehicle body B. In FIG. 2A, the colored areas (dotted areas) indicate the areas where the ranging signal is stably received by the ranging units 21 when all the ranging units 21 are normally operating. In the following, the areas where the ranging signal is stably received by the ranging units 21 will be referred to as "stably ranging areas Z".

In FIG. 2A, a boundary (outer circumference) of an area where the user can monitor the movement of the vehicle S (hereinafter referred to as "monitorable area X") is shown by a solid oval. The monitorable area X is defined as an area where the distance from the vehicle S is equal to or less than a distance threshold $D_{th}$. In the present embodiment, the distance threshold $D_{th}$ is set to 6 m, and the position of the operation terminal 3 is regarded as being identical to the position of the user. Accordingly, when the operation terminal 3 is present in the monitorable area X, it is estimated that the user can monitor the movement of the vehicle S, so that the vehicle S can be moved by using the operation terminal 3.

In a case where all the ranging units 21 are operating normally, the stably ranging areas Z are located in the monitorable area X and set so as to substantially cover the monitorable area X. In a case where any of the ranging units 21 fail, the stably ranging areas Z in total become smaller as compared with a case where all the ranging units 21 are operating normally. When the user performs an operation input to the operation terminal 3 to move the vehicle S, it is desirable that the user (namely, the operation terminal 3) is present in the stably ranging areas Z.

Figure 3:
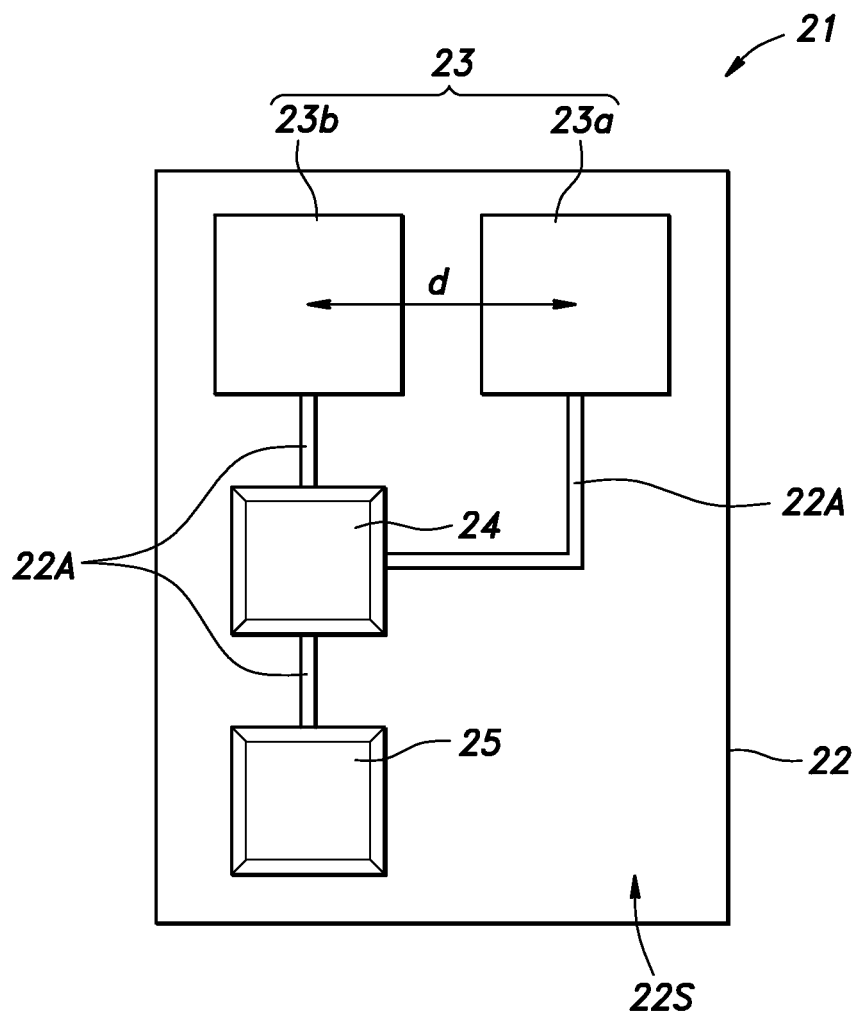
FIG. 3 is a front view of one of the ranging units.

As shown in FIG. 3, each ranging unit 21 includes a plate-shaped circuit board 22, plural antennas 23 (23a and 23b) provided on a surface of the circuit board 22, a communication IC 24, and a reception CPU 25 (processing device).

The circuit board 22 is a so-called printed circuit board on which wiring parts 22A are formed by using metal thin films (in the present embodiment, copper foil) provided on an insulator, such as an epoxy plate of several centimeters square. Each antenna 23 is formed by providing a metal thin film (in the present embodiment, copper foil) with a prescribed pattern on a surface of the printed circuit board. The shape of each antenna 23 is designed such that each antenna 23 can receive electromagnetic waves in a frequency band of 2.4 GHz, which is used in the communication based on Bluetooth. Accordingly, each antenna 23 can receive the ranging signal. The antennas 23 are provided on the surface of the circuit board 22, and thus the surface of the circuit board 22 functions as a reception surface 22S for receiving the ranging signal.

In the present embodiment, the circuit board 22 has a substantially rectangular shape, and the two antennas 23 are arranged along a short side of the circuit board 22. The distance d between the two antennas 23 is set to equal to or less than a half wavelength (more specifically, equal to or less than 60 mm). Each antenna 23 is formed in a substantially square shape, and is connected to the communication IC 24 via the prescribed wiring parts 22A.

Each ranging unit 21 is attached and fixed to the vehicle body B such that short sides of the circuit board 22 are substantially horizontal, the reception surface 22S faces an outside of the vehicle S, and the reception surface 22S of each ranging unit 21 is positioned at the same height (see FIG. 2B). Immediately after each ranging unit 21 is attached to the vehicle body B, each ranging unit 21 is arranged in a reference position P with a reference posture. As shown in FIG. 2A, the reference position P represents a position of the center G of the circuit board 22 of each ranging unit 21 with respect to the center $G_0$ of the vehicle body B (more specifically, the center of the vehicle body B both in the vehicle length direction and the vehicle width direction). In the present embodiment, the reference position P is represented by using a coordinate system in which the x-axis represents the vehicle width direction and the y-axis represents the vehicle length direction. Further, the reference posture represents the direction of the reception surface 22S at a time of shipment from a factory (namely, an initial value of the attachment direction of the reception surface 22S). The reference posture is represented by a rotation angle (hereinafter referred to as "reference angle $\delta$") around an up-down axis. The reference angle $\delta$ is set such that a state where the reception surface 22S faces forward is a basic state. Namely, the reference angle $\delta$ is set to "zero" in the state where the reception surface 22S faces forward. The reference angle $\delta$ is set such that the clockwise direction in a plan view is a positive direction. Namely, the reference angle $\delta$ increases as the reception surface 22S rotates in the clockwise direction in a plan view. The reference position P of each ranging unit 21 is set on an outer surface of the vehicle body B, and the reference angle $\delta$ of each ranging unit 21 is set such that the reception surface 22S extends along the outer surface of the vehicle body B.

As shown in FIG. 2A, in the present embodiment, the reference angle $\delta$ of the ranging units 21 provided on the front surface of the vehicle body B is set to 0 degree, the reference angle $\delta$ of the ranging units 21 provided on the rear surface of the vehicle body B is set to 180 degrees, the reference angle $\delta$ of the ranging units 21 provided on the right surface of the vehicle body B is set to 90 degrees, and the reference angle $\delta$ of the ranging units 21 provided on the left surface of the vehicle body B is set to 270 degrees. Thus, each ranging unit 21 is arranged such that the reception surface 22S faces the outside of the vehicle S and extends substantially along the outer surface of the vehicle body B.

Further, the ranging units 21 provided at the both lateral ends on the front surface of the vehicle body B are bilaterally symmetrical with each other, and thus the fore and aft positions of these ranging units 21 are identical to each other. Similarly, the ranging units 21 provided at the both lateral ends on the rear surface of the vehicle body B are bilaterally symmetrical with each other, and thus the fore and aft positions of these ranging units 21 are identical to each other. Further, the ranging units 21 provided on the right surface of the vehicle body B and the ranging units 21 provided on the left surface of the vehicle body B are bilaterally symmetrical with each other.

The communication IC 24 is a semiconductor chip including an integrated circuit. The communication IC 24 is soldered on the surface of the circuit board 22, and is connected to the plural antennas 23 (in the present embodiment, two antennas 23) and the reception CPU 25 on the circuit board 22 via the wiring parts 22A on the circuit board 22. When the respective antennas 23 receive signals, the communication IC 24 acquires the signals from the respective antennas 23, and thus outputs the phase difference between the acquired signals to the reception CPU 25 based on the change in the voltage of each signal and the time difference between the signals. In the present embodiment, the communication IC 24 acquires an electric potential (hereinafter referred to as "voltage") of each antenna 23 with respect to the ground (for example, the vehicle body B), and thus calculates the phase difference between the signals (voltages) received by the antennas 23 based on a time change in the voltage of each antenna 23.

Figure 4A:
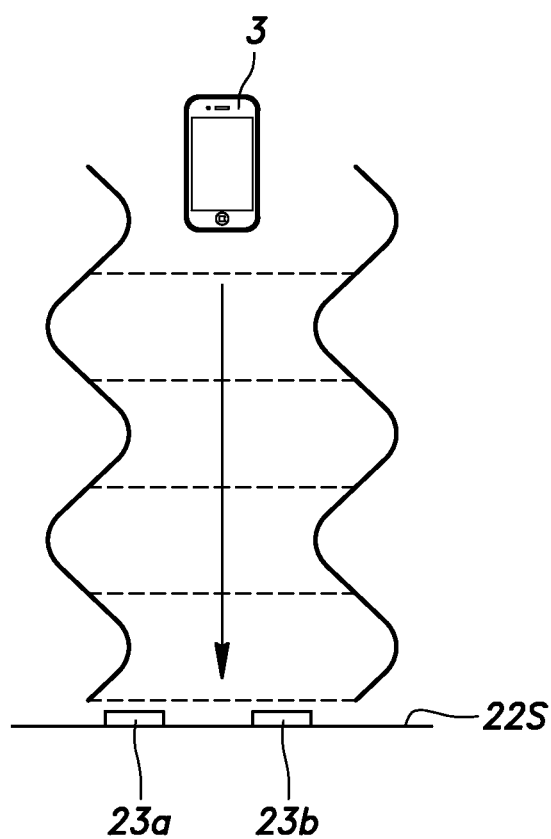
FIG. 4A is an explanatory diagram showing a ranging signal transmitted from an operation terminal such that the ranging signal is perpendicular to a reception surface in a plan view.
Figure 4B:
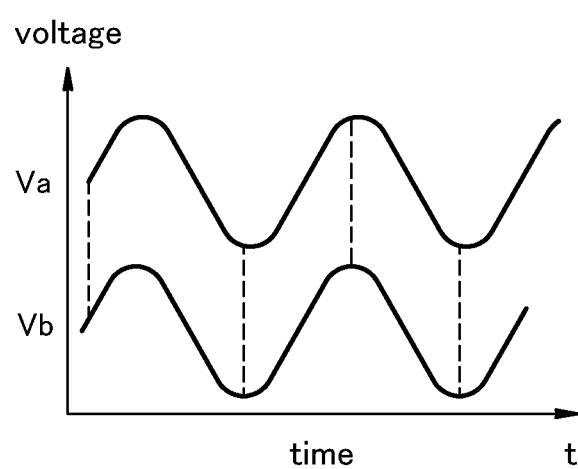
FIG. 4B is a graph showing a time change in a signal (voltage) received by each of two antennas in the case shown in FIG. 4A.
Figure 5A:
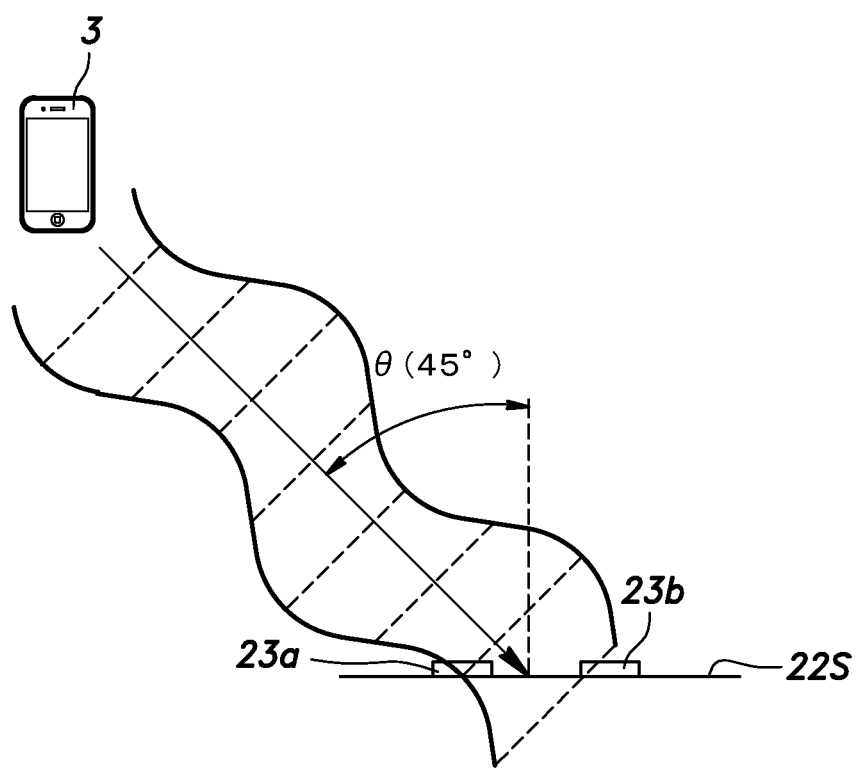
FIG. 5A is an explanatory diagram showing the ranging signal transmitted from the operation terminal such that the ranging signal is at 45 degrees to a perpendicular line of the reception surface in a plan view.
Figure 5B:
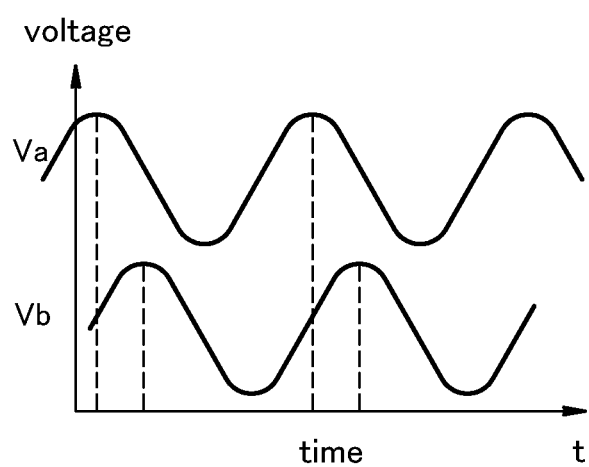
FIG. 5B is a graph showing a time change in a signal (voltage) received by each of two antennas in the case shown in FIG. 5A.

As shown in FIG. 4A, in a case where the ranging signal is transmitted from the operation terminal 3 such that the ranging signal is perpendicular to the reception surface 22S in a plan view, the voltages Va and Vb of the two antennas 23a and 23b change sinusoidally such that the phase difference between the voltages Va and Vb is zero (see FIG. 4B). On the other hand, as shown in FIG. 5A, in a case where the ranging signal is transmitted from the operation terminal 3 such that the ranging signal is at 45 degrees to a perpendicular line of the reception surface 22S in a plan view, the voltages Va and Vb of the two antennas 23a and 23b change sinusoidally such that the phase difference occurs between the voltages Va and Vb (see FIG. 5B).

The reception CPU 25 consists of a so-called central processing unit, and is configured to acquire (detect) an arrival direction of the ranging signal with respect to the reception surface 22S based on the phase difference output by the communication IC 24. The arrival direction corresponds to an angle formed between an incident direction of the ranging signal and a normal (perpendicular) of the reception surface 22S. Namely, the arrival direction corresponds to an incident angle of the ranging signal. The arrival direction is represented by an angle (hereinafter referred to as "arrival angle $\theta$") formed between a straight line (hereinafter referred to as "reference line") and a travel direction of the ranging signal (see FIG. 6B). The reference line extends perpendicularly to the reception surface 22S so as to deviate from the center of the two antennas 23 in a top view.

Figure 6A:
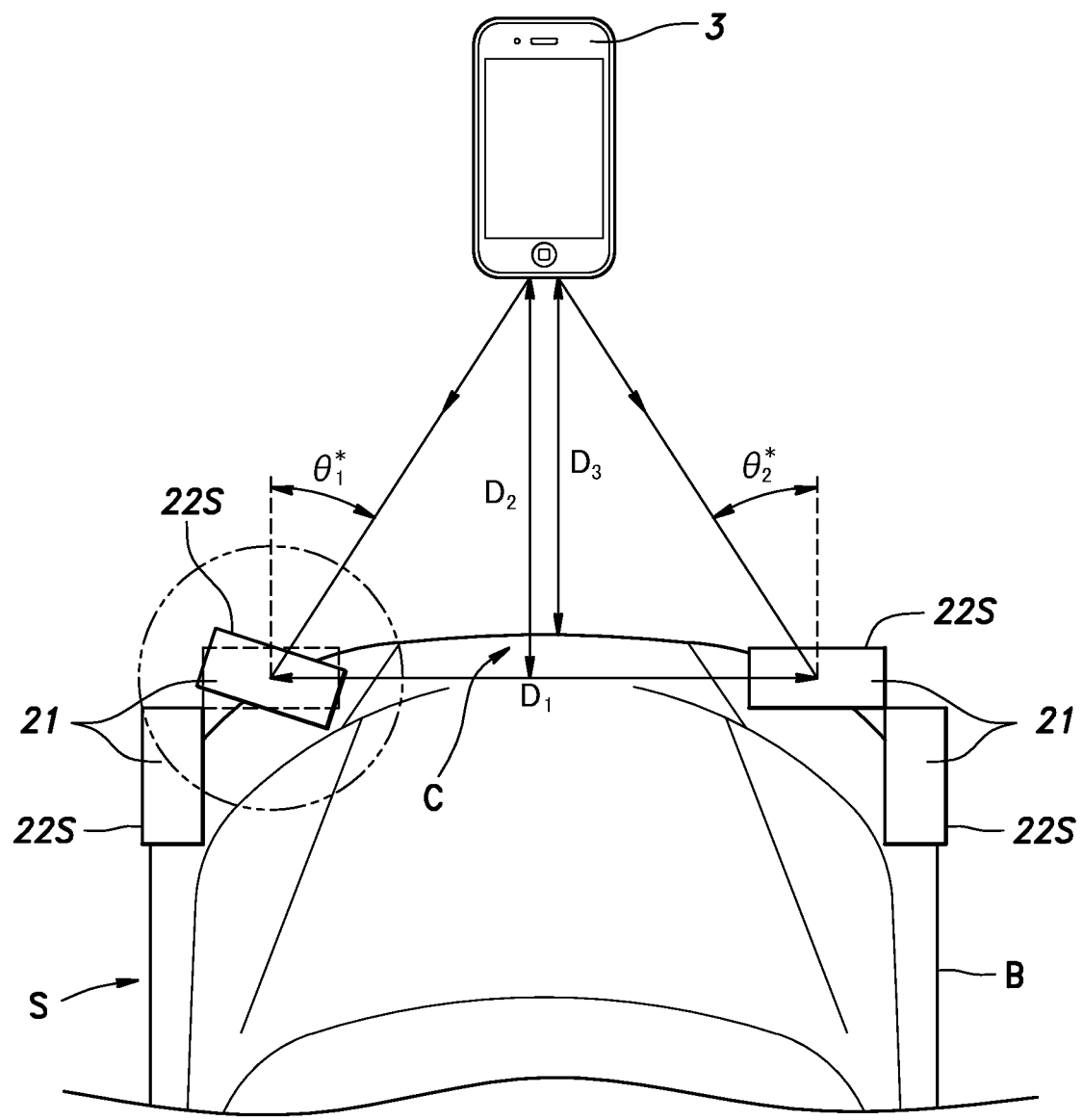
FIG. 6A is a plan view showing how a distance is measured by using the ranging units.
Figure 6B:
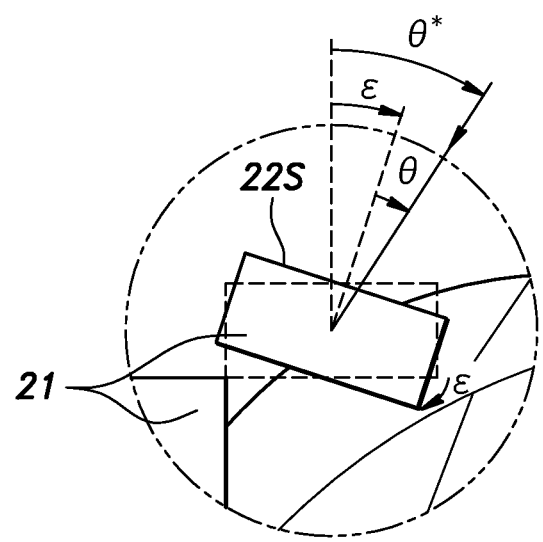
FIG. 6B is an enlarged view of a part surrounded by a two-dot chain circle in FIG. 6A.

The arrival angle θ is determined such that the clockwise direction in a top view is a positive direction (namely, the arrival angle θ is determined such that the arrival angle θ>0 in FIG. 6B).

While the operation terminal 3 is transmitting the ranging signal, the arrival direction of the ranging signal is identical to the direction of the generating source of the ranging signal (namely, the direction of the operation terminal 3) with respect to the reception surface 22S. Accordingly, while the operation terminal 3 is transmitting the ranging signal, the reception CPU 25 can acquire the direction of the operation terminal 3 with respect to the reception surface 22S by acquiring the arrival direction of the ranging signal.

More specifically, in a case where the distance between the two antennas 23 is sufficiently smaller than the distance between each antenna 23 and the operation terminal 3 and the ranging signal received by each antenna 23 can be regarded as a plane wave, the arrival angle θ can be calculated by the following formula.

$$\theta = \sin^{-1}(\varphi \lambda / d)$$

In the above formula, d [mm] represents the distance between the two antennas 23, λ [mm] represents the wavelength of the ranging signal, and φ [rad] represents the phase difference between the antennas 23.

On receiving the ranging signal, the reception CPU 25 of each ranging unit 21 outputs the arrival angle ↓ and a reception intensity I of the ranging signal to the control device 15.

As shown in FIG. 1, the navigation device 10 is configured to acquire a current position of the vehicle S and to provide route guidance to a destination and the like. The navigation device 10 includes a GPS receiving unit 26 and a map storage unit 27. The GPS receiving unit 26 identifies a position (latitude and longitude) of the vehicle S based on a signal received from an artificial satellite (positioning satellite). The map storage unit 27 consists of a known storage device such as a flash memory or a hard disk, and stores map information.

The driving operation device 11 is provided in a vehicle cabin of the vehicle S and configured to accept an input operation (driving operation) by the user (driver) to control the vehicle S. The driving operation device 11 includes an accelerator pedal, a brake pedal, a steering wheel, a shift lever, and a push start switch (engine start button). The push start switch is configured to accept a starting operation of the vehicle S (the input operation to start operation of the vehicle S) by the user (driver). The driving operation device 11 may further include an element to activate the parking brake device.

The HMI 13 is configured to notify the user of various kinds of information by a display or a voice and to accept the input operation by the user. For example, the HMI 13 includes a touch panel 28 configured to accept the input operation by the user and a sound generating device 29 such as a buzzer or a speaker. The touch panel 28 includes a liquid crystal display, an organic EL display, or the like.

The notification device 14 is configured to give a notification to the user present outside the vehicle S by at least one of a sound and light. In the present embodiment, the notification device 14 includes headlights 30 (lights) configured to illuminate the front of the vehicle S and a horn unit 31 (a sound device) configured to generate a warning sound (horn) toward the outside of the vehicle S. The notification device 14 is configured to be activated based on a signal from the control device 15. More specifically, the headlights 30 are configured to blink based on the signal from the control device 15, and the horn unit 31 is configured to generate the warning sound toward the outside of the vehicle S based on the signal from the control device 15.

The control device 15 consists of an electronic control unit (ECU) that includes a CPU, a nonvolatile memory such as a ROM, a volatile memory such as a RAM, and the like. The CPU is configured to execute operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The at least one operation terminal 3 consists of a wireless terminal configured to be carried by the user and to communicate with the control device 15 from outside the vehicle S via the communication device 9. In the present embodiment, the operation terminal 3 consists of a smartphone. A prescribed application is installed on the operation terminal 3 in advance so that the operation terminal 3 can communicate with the control device 15.

The operation terminal 3 includes an input/output unit 32, a position detection unit 33, a communication unit 34, and a processing unit 35.

The input/output unit 32 is configured to provide information to the user operating the operation terminal 3 and to accept an input by the user operating the operation terminal 3. The input/output unit 32 consists of a touch panel, for example. On accepting the input by the user, the input/output unit 32 outputs a signal corresponding to the input to the processing unit 35.

The position detection unit 33 is configured to acquire positional information about the operation terminal 3. The position detection unit 33 may acquire the positional information about the operation terminal 3 by receiving a signal from a geodetic satellite (GPS satellite), for example. The position detection unit 33 is configured to output the acquired positional information about the operation terminal 3 to the processing unit 35.

The communication unit 34 is configured to mediate communication between the operation terminal 3 and the control device 15. The communication unit 34 includes an antenna to exchange a wireless signal (more specifically, a wireless signal in a frequency band corresponding to the standard of Bluetooth) with an outside device (for example, the communication device 9) based on the signal from the processing unit 35.

The processing unit 35 is configured to execute processing corresponding to an application based on the input to the input/output unit 32 by the user, the wireless signal received by the communication unit 34, and the signal from the control device 15. Further, the processing unit 35 is configured to appropriately cause the input/output unit 32 to display the result of the executed processing and to appropriately control the communication unit 34 so as to cause the communication unit 34 to transmit the wireless signal to the outside device (for example, the communication device 9). More specifically, when the user inputs a starting instruction (an instruction to start an application for executing the remote operation of the vehicle S) to the input/output unit 32, the processing unit 35 controls the communication unit 34 so as to cause the communication unit 34 to transmit the ranging signal (more specifically, the advertising signal) at regular time intervals.

When at least two of the ranging units 21 are normally operating (namely, at least two of the ranging units 21 can measure the distance) and the operation terminal 3 is present in the monitorable area X, the control device 15 controls the vehicle S based on the operation input to the operation terminal 3, and thus executes the so-called remote parking to move the vehicle S to a prescribed parking position and to park the vehicle S at the parking position. In order to execute this control of the vehicle S, the control device 15 includes an external environment recognizing unit 41, a vehicle position identifying unit 42, an action plan unit 43, a travel control unit 44, and a storage unit 45.

The external environment recognizing unit 41 is configured to recognize an object (for example, an obstacle such as a parked vehicle or a wall) present around the vehicle S based on the detection result of the external environment sensor 7 and to acquire information about the obstacle. Further, the external environment recognizing unit 41 is configured to analyze images captured by the external cameras 18 based on a known image analysis method such as pattern matching, to determine whether the obstacle is present, and to acquire the size of the obstacle in a case where the obstacle is present. Further, the external environment recognizing unit 41 may calculate a distance to the obstacle based on signals from the sonars 17 to acquire the position of the obstacle.

The vehicle position identifying unit 42 is configured to identify the position of the vehicle S (own vehicle) based on a signal from the GPS receiving unit 26 of the navigation device 10. Further, the vehicle position identifying unit 42 may acquire the vehicle speed and the yaw rate of the vehicle S from the vehicle sensor 8 in addition to the signal from the GPS receiving unit 26 so as to identify the position and the posture of the vehicle S by so-called inertial navigation.

The external environment recognizing unit 41 is configured to analyze the detection result of the external environment sensor 7 (more specifically, the images captured by the external cameras 18) based on a known image analysis method such as pattern matching and to recognize a position of a white line on a road surface of a parking area, for example.

The travel control unit 44 is configured to control the powertrain 4, the brake device 5, and the steering device 6 based on a travel control instruction (moving instruction) from the action plan unit 43 and to cause the vehicle S to travel.

The storage unit 45 consists of a RAM and the like, and is configured to store information necessary for executing processing of the action plan unit 43 and the travel control unit 44.

The storage unit 45 is configured to store a reference table (see FIG. 7A). In the reference table, the unit ID of each ranging unit 21 provided on the vehicle body B, the reference position P of each ranging unit 21, and the reference angle δ of each ranging unit 21 are associated with each other. Further, the storage unit 45 is configured to store information about an outline of the vehicle body B (hereinafter referred to as "outline information").

Further, the storage unit 45 is configured to store the arrival angle θ of an initial test signal received by each ranging unit 21 as "initial angle φ", and an intensity of the initial test signal as "initial intensity $I_0$" in the reference table such that the initial angle φ and the initial intensity $I_0$ are associated with the unit ID. The initial test signal is a test signal (a ranging signal with a predetermined intensity transmitted from the communication antenna 20) after each ranging unit 21 is attached to the vehicle body B and before the vehicle S is shipped from a factory. The initial angle φ and the initial intensity $I_0$ may be acquired by vehicle testing carried out after each ranging unit 21 (communication antenna 20) is attached to the vehicle body B and before the vehicle S is shipped, or may be calculated by a simulation.

When the HMI 13 or the operation terminal 3 accepts an input by the user, the action plan unit 43 calculates a trajectory (travel route) of the vehicle S and outputs the travel control instruction to the travel control unit 44, if necessary.

<Parking Assist Processing>

Figure 8:
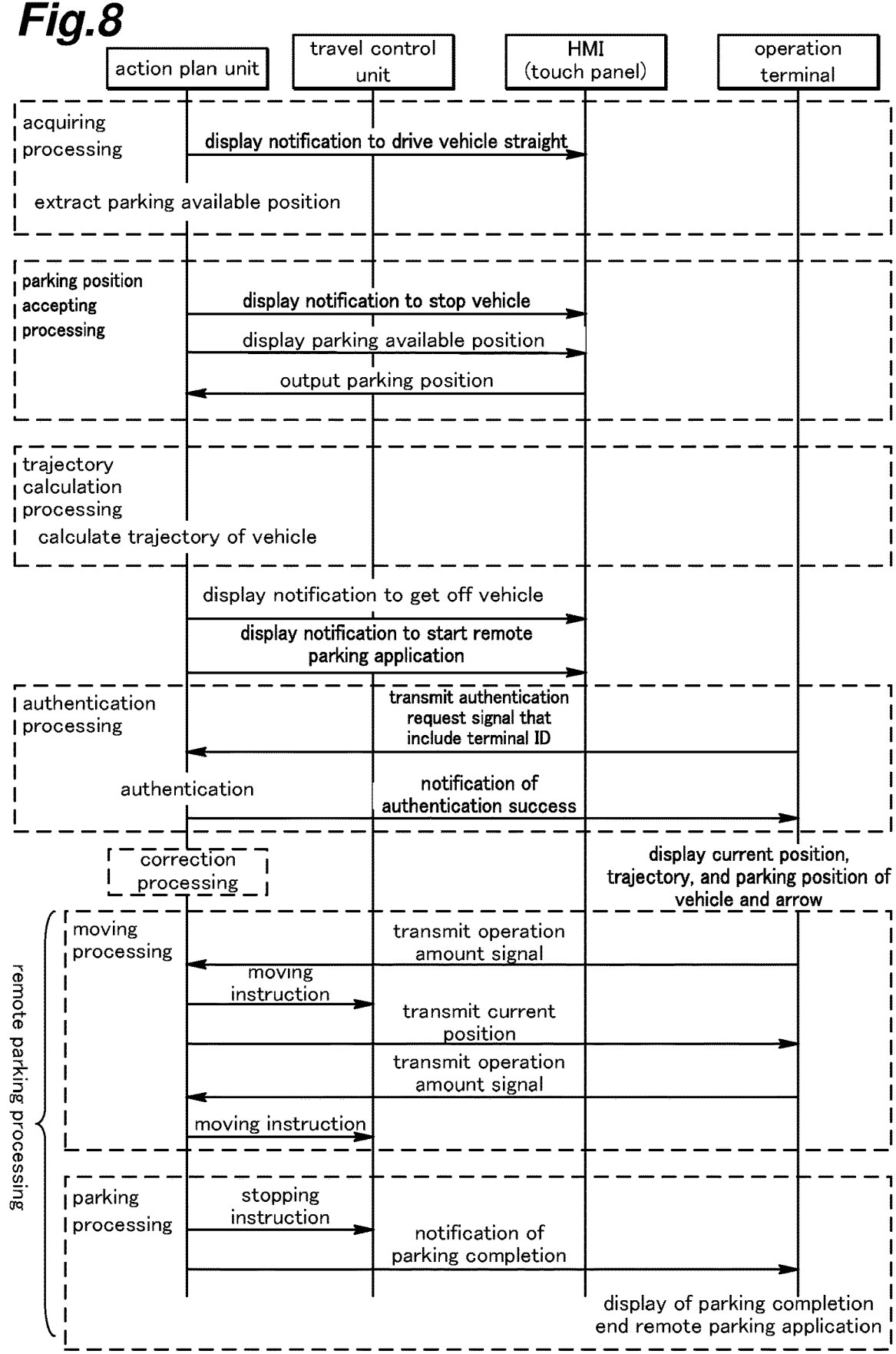
FIG. 8 is a sequence diagram showing parking assist processing.

When the user performs an input corresponding to desire for parking assistance by a remote operation after the vehicle S has stopped, the action plan unit 43 executes parking assist processing. In the following, the parking assist processing will be described with reference to a sequence diagram of FIG. 8.

First, the action plan unit 43 executes acquiring processing to acquire at least one space to park the vehicle S (hereinafter referred to as "parking available position"). More specifically, the action plan unit 43 causes the touch panel 28 of the HMI 13 to display a notification that instructs the user (driver) to drive the vehicle S straight. While the user (driver) is driving the vehicle S straight, the action plan unit 43 acquires the position and the size of the obstacle and the position of the white line on the road surface based on the signal from the external environment sensor 7. The action plan unit 43 extracts the at least one parking available position based on the position and the size of the obstacle and the position of the white line.

Next, the action plan unit 43 executes parking position accepting processing to accept a selection of the parking position from the at least one parking available position. More specifically, the action plan unit 43 causes the touch panel 28 to display a notification that instructs the user to stop the vehicle S, in a case where the action plan unit 43 extracts the at least one parking available position in the above acquiring processing. At this time, the action plan unit 43 may cause the touch panel 28 to also display a notification that instructs the user to change a position of the shift lever to the parking position after the vehicle S has stopped.

Next, the action plan unit 43 causes the touch panel 28 to display the current position of the vehicle S and the at least one parking available position. At this time, the action plan unit 43 may cause the touch panel 28 to display the current position of the vehicle S and the at least one parking available position on the image acquired by the external cameras 18. After that, the action plan unit 43 causes the touch panel 28 to display a notification that instructs the user to select the parking position from the at least one parking available position. When the user inputs a desired parking position to the touch panel 28, the touch panel 28 outputs a signal corresponding to the inputted parking position to the action plan unit 43.

Next, when the action plan unit 43 receives the parking position inputted by the user from the touch panel 28, the action plan unit 43 executes trajectory calculation processing to calculate a trajectory of the vehicle S from the current position to the parking position. In a case where the user performs the input to select a parking direction, the action plan unit 43 may calculate the trajectory of the vehicle S based on not only the current position and the parking position but also the parking direction selected by the user.

When the calculation of the trajectory of the vehicle S is completed, the action plan unit 43 causes the touch panel 28 to display a notification that prompts the user to get off the vehicle S and a notification that instructs the user to start dedicated application software for remote parking processing (hereinafter referred to as "remote parking application") by using the operation terminal 3. According to these notifications, the user gets off the vehicle S, and then starts the remote parking application by using the operation terminal 3.

After that, an input button for connecting the operation terminal 3 to the vehicle S is displayed on the input/output unit 32 of the operation terminal 3. When the user touches the input button, the processing unit 35 of the operation terminal 3 causes the communication unit 34 to transmit the ranging signal (namely, the advertisement signal) at regular time intervals. On receiving the ranging signal via the communication antenna 20, the action plan unit 43 communicates with the operation terminal 3 and thus executes authentication processing to authenticate the operation terminal 3. When the authentication of the operation terminal 3 is completed (succeeds), the action plan unit 43 executes correction processing. More specifically, the correction processing includes processing for determining whether at least two ranging units 21 required for measuring the distance are normally operating and thus the remote parking can be executed. Further, the correction processing includes processing for acquiring a correction angle ε for correcting the arrival angle θ actually detected by each ranging unit 21 to the arrival angle θ to be detected by each ranging unit 21 at the time of shipment from the factory (hereinafter referred to as "arrival angle correction value θ*"), namely, at a time when each ranging unit 21 is in the reference posture. Details of the correction processing will be described later.

In a case where the remote parking can be executed, the action plan unit 43 transmits a start signal to the operation terminal 3. The start signal includes the current position, the trajectory, and the parking position of the vehicle S. When the operation terminal 3 receives the start signal, the input/output unit 32 of the operation terminal 3 displays the current position, the trajectory, and the parking position of the vehicle S. Simultaneously, the input/output unit 32 of operation terminal 3 may display a bidirectional arrow directed both upward and downward and notify the user that the operation input to the input/output unit 32 can be performed by an upward or downward swiping operation. After that, the user performs the operation input to the input/output unit 32 by the swiping operation, so that the user can instruct the action plan unit 43 to execute the remote parking processing. The remote parking processing includes moving processing to move the vehicle S to the parking position and parking processing to park the vehicle S at the parking position.

In a case where the remote parking cannot be executed, the action plan unit 43 transmits a failure notification signal to the operation terminal 3 so as to cause the operation terminal 3 to notify the user of a failure (abnormality) of each ranging unit 21. Accordingly, the input/output unit 32 of the operation terminal 3 displays a notification to notify the user of the failure of each ranging unit 21. At this time, the action plan unit 43 acquires failure information from the storage unit 45 and then transmits the failure notification signal including the failure information to the operation terminal 3. The failure information includes the unit ID of each ranging unit 21 whose failure is detected and the reference position P of this ranging unit 21. On acquiring the failure information, the operation terminal 3 may notify the user of the failure of each ranging unit 21, and the input/output unit 32 (touch panel) may display the position of each ranging unit 21 whose failure is detected. When the input/output unit 32 displays the above position, the action plan unit 43 ends the parking assist processing.

In this way, the position of each ranging unit 21 whose failure has determined (hereinafter, referred to as "failed ranging unit 21") is displayed on the input/output unit 32, so that the user can recognize the position of the failed ranging unit 21. Accordingly, the user can easily repair or replace the failed ranging unit 21.

As described above, in a case where the action plan unit 43 determines that the remote parking can be executed, the input/output unit 32 of the operation terminal 3 displays the current position, the trajectory, and the parking position of the vehicle S together with the bidirectional arrow. After that, the action plan unit 43 continuously executes terminal position determination processing at prescribed time intervals until the vehicle S moves to the parking position. In the terminal position determination processing, the action plan unit 43 determines whether the user can monitor the movement of the vehicle S. More specifically, in a case where the operation terminal 3 is present in an area where the distance from the operation terminal 3 to the vehicle S is equal to or less than the distance threshold $D_{th}$ (namely, in a case where the operation terminal 3 is present in the monitorable area X), the action plan unit 43 determines that the user can monitor the movement of the vehicle S. Otherwise, the action plan unit 43 determines that the user cannot monitor the movement of the vehicle S and thus prohibits the movement of the vehicle S. At this time, in a case where the vehicle S is moving, the action plan unit 43 stops the vehicle S. After that, the action plan unit 43 waits until the distance from the operation terminal 3 to the vehicle S becomes equal to or less than the distance threshold $D_{th}$. Further, in the terminal position determination processing, the action plan unit 43 acquires the distance from the operation terminal 3 to the vehicle S and the direction of the operation terminal 3 with respect to the vehicle S (namely, the direction of the operation terminal 3 as seen from the vehicle S).

When the user performs the operation input by the swiping operation along the bidirectional arrow displayed on the input/output unit 32, the operation terminal 3 transmits an operation amount signal (a signal corresponding to an amount of the swiping operation) to the action plan unit 43.

In a case where the communication antenna 20 receives the operation amount signal when the operation terminal 3 is present in the monitorable area X (an area where the distance from the operation terminal 3 to the vehicle S is equal to or less than the distance threshold $D_{th}$), the action plan unit 43 converts the operation amount signal into a moving distance of the vehicle S. On the other hand, in a case where the communication antenna 20 receives the operation amount signal when the operation terminal 3 is present outside the monitorable area X, the action plan unit 43 prohibits the movement of the vehicle S and waits until the distance from the operation terminal 3 to the vehicle S becomes equal to or less than the distance threshold $D_{th}$.

When the conversion from the operation amount signal into the moving distance of the vehicle S is completed, the action plan unit 43 calculates the direction to move the vehicle S (hereinafter referred to as "moving direction") based on the current position and the trajectory of the vehicle S. Further, the action plan unit 43 calculates an estimated position of the vehicle S in a case where the vehicle S moves along the trajectory by the moving distance.

Next, the action plan unit 43 determines whether the operation terminal 3 is present in the moving direction of the vehicle S and the distance from the operation terminal 3 to the vehicle S is equal to or less than the moving distance based on the distance from the operation terminal 3 to the vehicle S, the direction of the operation terminal 3 with respect to the vehicle S, the moving distance, and the moving direction. In a case where the operation terminal 3 is present in the moving direction of the vehicle S and the distance from the operation terminal 3 to the vehicle S is equal to or less than the moving distance, the action plan unit 43 stops the vehicle S and then transmits a warning signal to the operation terminal 3. When the operation terminal 3 receives the warning signal, the input/output unit 32 of the operation terminal 3 displays a notification (warning) that prompts the user to evacuate. Accordingly, it is possible to prevent the vehicle S from coming into contact with the user holding the operation terminal 3, so that the safety of the vehicle S can be enhanced. Further, by displaying the warning on the operation terminal 3, the user can easily recognize that the user needs to evacuate.

Further, the action plan unit 43 may activate the notification device 14 after transmitting the warning signal. More specifically, the action plan unit 43 blinks the headlights 30 and activates the horn unit 31 to generate the warning sound, thereby warning the user that the vehicle S is approaching the user. In another embodiment, at this time, the action plan unit 43 may either blink the headlights 30 or activate the horn unit 31. The user can easily recognize that the user needs to evacuate according to the notification by the notification device 14, so that the safety of the vehicle S can be further enhanced. Also, by using a device such as the headlights 30 and the horn unit 31 (namely, a device that has already been installed in the vehicle S or a device that is generally installed in the vehicle S) as the notification device 14, the notification (warning) can be easily given to the user.

Further, in a case where the operation terminal 3 is not present in the moving direction of the vehicle S or the distance from the operation terminal 3 to the vehicle S is greater than the moving distance, the action plan unit 43 controls the vehicle S and thus executes the moving processing to move the vehicle S to the estimated position.

The period from a time when the user performs the operation input to the input/output unit 32 of the operation terminal 3 to a time when the movement of the vehicle S to the estimated position is completed is sufficiently short, and the vehicle S moves according to the swiping operation. When the user stops touching the input/output unit 32 (namely, when the user stops the swiping operation), the vehicle S stops immediately.

In the moving processing, the action plan unit 43 determines whether the vehicle S has reached the parking position. In a case where the action plan unit 43 determines that the vehicle S has reached the parking position, the action plan unit 43 executes the parking processing to park the vehicle S. In a case where the vehicle S has not reached the parking position, the action plan unit 43 moves the vehicle S to the estimated position and stops the vehicle S at the estimated position, and then waits until receiving the operation amount signal.

In the parking processing, the action plan unit 43 first activates the brake device 5, and then activates the parking brake device. When the parking processing is completed (namely, when the parking of the vehicle S is completed), the action plan unit 43 transmits a notification of parking completion (a notification to indicate that the parking of the vehicle S is completed) to the operation terminal 3.

When the operation terminal 3 receives the notification of parking completion, the input/output unit 32 of the operation terminal 3 displays a notification to indicate that the parking of the vehicle S is completed, and the operation terminal 3 ends the remote parking application. Thereby, the parking assist processing is completed.

<The Correction Processing>

Figure 9:
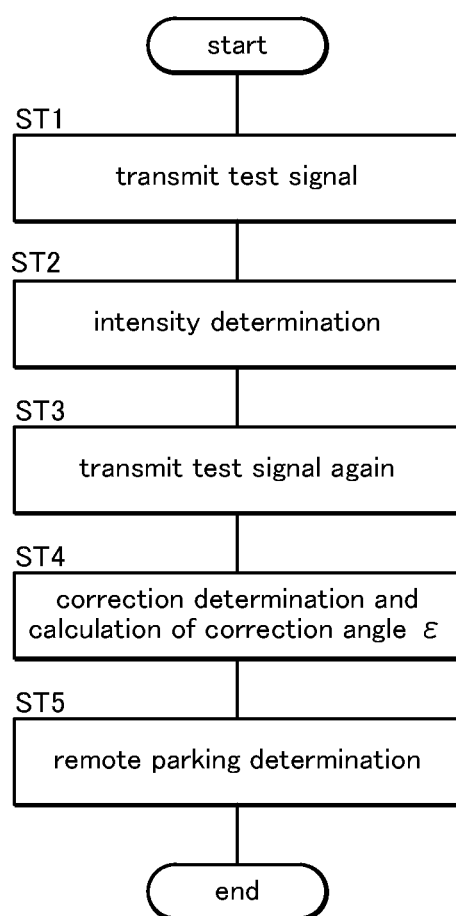
FIG. 9 is a flowchart showing correction processing.

Next, with reference to a flowchart shown in FIG. 9, the details of the correction processing will be described.

On starting the correction processing, the action plan unit 43 first causes the communication antenna 20 to transmit the test signal to all the ranging units 21 (ST1).

When the transmission of the test signal is completed, the action plan unit 43 acquires the reception intensity I of the test signal from all the ranging units 21, and thus determines whether the acquired reception intensity I and the corresponding initial intensity $I_0$ (namely, the initial intensity $I_0$ of each ranging unit 21 from which the reception intensity I is acquired) are substantially identical to each other. Namely, the action plan unit 43 makes an intensity determination. At this time, in a case where the absolute value of the difference between the acquired reception intensity I and the corresponding initial intensity $I_0$ is equal to or less than a prescribed determination value, the action plan unit 43 may determine that the acquired reception intensity I and the corresponding initial intensity $I_0$ are substantially identical to each other. After that, the action plan unit 43 causes the storage unit 45 to store intensity information in a correction table shown in FIG. 7B (ST2). The intensity information includes the unit ID of each ranging unit 21, the reception intensity I corresponding to the unit ID, and an intensity determination result that indicates whether the acquired reception intensity I and the corresponding initial intensity $I_0$ are substantially identical to each other.

Next, the action plan unit 43 causes the communication antenna 20 to transmit the test signal to all the ranging units 21 again (ST3).

After that, the action plan unit 43 refers to the correction table stored in the storage unit 45 and thus acquires the arrival angle θ from each ranging unit 21 whose reception intensity I is equal to or greater than a prescribed threshold (hereinafter referred to as "intensity threshold $I_{th}$"). After that, the action plan unit 43 determines whether the arrival angle θ acquired by each ranging unit 21 can be corrected by comparing the arrival angle θ acquired by each ranging unit 21 and the initial angle φ of each ranging unit 21. Namely, the action plan unit 43 makes a correction determination. In the present embodiment, in a case where the absolute value of the difference between the arrival angle θ acquired by each ranging unit 21 and the initial angle φ of each ranging unit 21 is equal to or less than a prescribed threshold, the action plan unit 43 determines that the arrival angle θ can be corrected. After that, the action plan unit 43 calculates the rotation angle of each ranging unit 21 with respect to the reference posture (namely, the posture at the time of shipment from the factory) based on the arrival angle θ of the test signal and the initial angle φ, and thus sets the calculated rotation angle to the correction angle ε. In the present embodiment, the action plan unit 43 calculates the correction angle ε (rotation angle) such that the clockwise direction in a top view is set to the positive direction. Further, at this time, the action plan unit 43 may calculate the correction angle ε (rotation angle) based on the difference between the arrival angle θ of the test signal and the initial angle φ. After that, as shown in FIG. 7B, the action plan unit 43 causes the storage unit 45 to store a correction determination result and the correction angle ε in the correction table such that the correction determination result and the correction angle ε are associated with the corresponding unit ID (ST4). The correction determination result is a determination result indicating whether the arrival angle θ of the test signal can be corrected.

When the correction angle ε and the correction determination result are stored in the storage unit 45, the action plan unit 43 determines whether the remote parking can be executed based on the intensity determination result and the correction determination result (ST5). Namely, the action plan unit 43 makes a remote parking determination. In the present embodiment, the action plan unit 43 refers to the correction table and thus determines whether the reception intensity I and the initial intensity $I_0$ of at least two ranging units 21 are substantially identical to each other and the arrival angle ε of the at least two ranging units 21 can be corrected. If the reception intensity I and the initial intensity $I_0$ of a specific ranging unit 21 is substantially different from each other or the arrival angle θ of the specific ranging unit 21 cannot be correct, a sensitivity or a posture of the specific ranging unit 21 is changed as compared with the time of shipment from the factory, and thus the specific ranging unit 21 is estimated to fail. In a case where at least two ranging units 21 do not fail, the distance from the operation terminal 3 to the vehicle S can be measured. Accordingly, in a case where the reception intensity I and the initial intensity $I_0$ of at least two ranging units 21 are substantially identical to each other and the arrival angle θ of the at least two ranging units 21 can be corrected, the action plan unit 43 determines that the remote parking can be executed and ends the correction processing. Otherwise, the action plan unit 43 determines that the remote parking cannot be executed, and the storage unit 45 stores the unit ID of the failed ranging unit 21 (namely, each ranging unit 21 whose reception intensity I and whose initial intensity $I_0$ are substantially different from each other or each ranging unit 21 whose arrival angle θ cannot be corrected). When the storage of the unit ID thereof is completed, the action plan unit 43 ends the correction processing.

In this way, by comparing the reception intensity I and the initial intensity $I_0$ or the arrival angle θ and the initial angle φ, the failure detection of each ranging unit 21 can be easily performed without separately preparing a device for the failure detection of each ranging unit 21.

<The Terminal Position Determination Processing>

Figure 10:
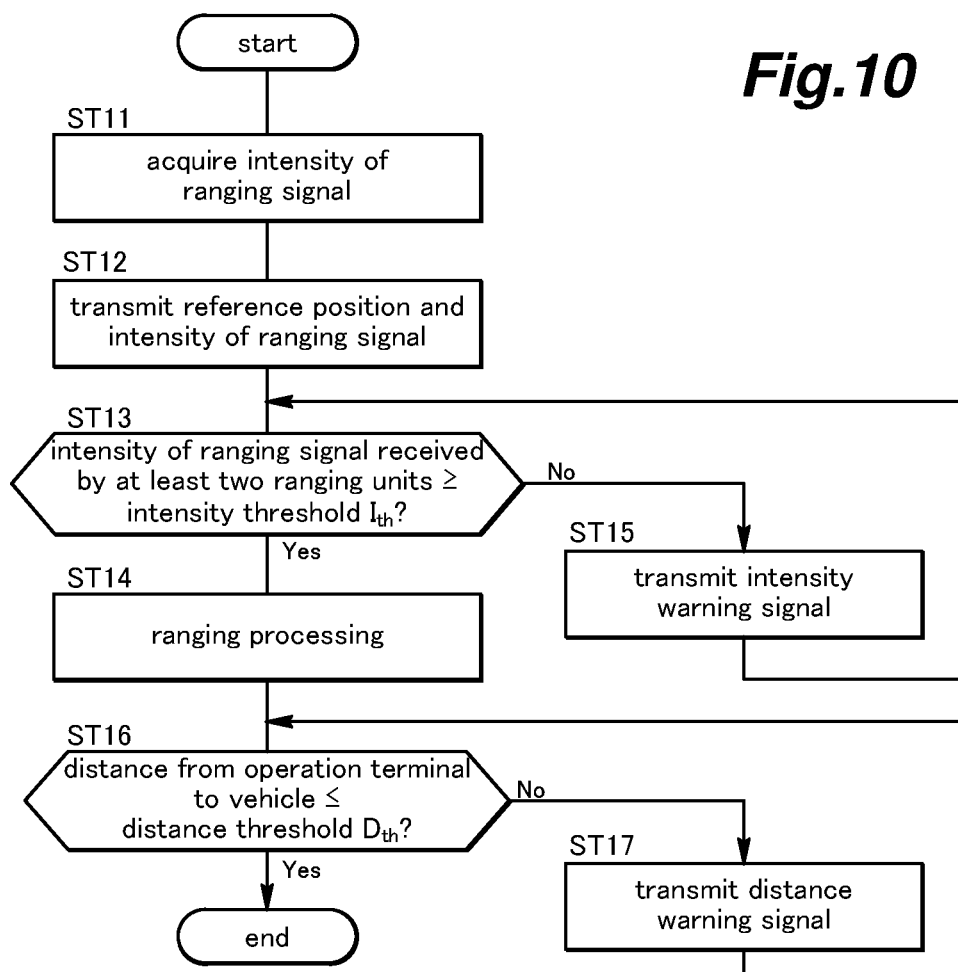
FIG. 10 is a flowchart showing terminal position determination processing.

Next, with reference to a flowchart shown in FIG. 10, details of the terminal position determination processing will be described.

On starting the terminal position determination processing, the action plan unit 43 first acquires the intensity of the ranging signal received by each ranging unit 21 from all the ranging units 21 other than the failed ranging unit 21 (ST11). After that, the action plan unit 43 refers to the storage unit 45 and thus acquires the reference position P of each ranging unit 21, and transmits an intensity signal to the operation terminal 3 (ST12). The intensity signal includes the unit ID, the reference position P of each ranging unit 21 corresponding to the unit ID, and the intensity of the ranging signal received by each ranging unit 21.

Figure 11:
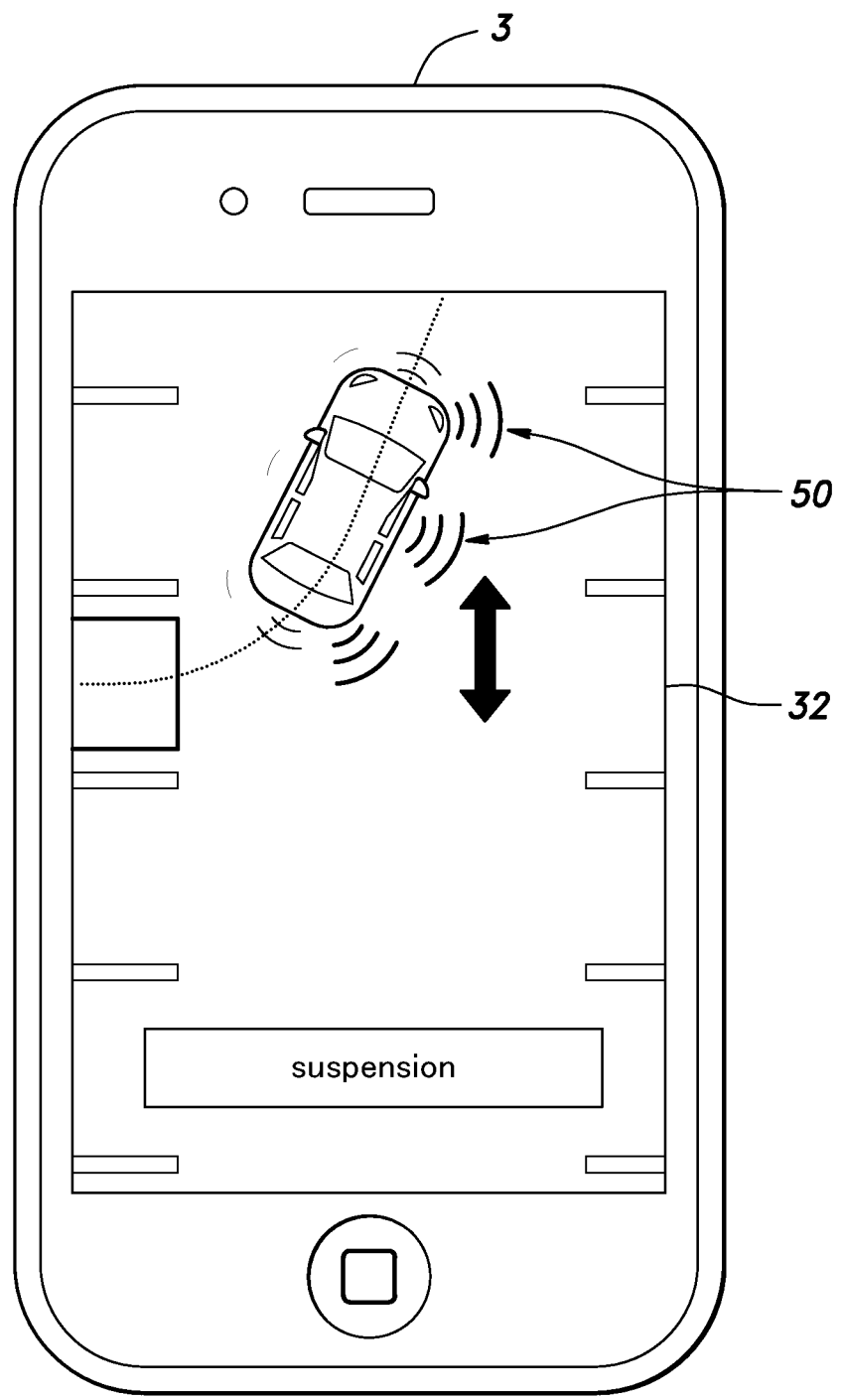
FIG. 11 is an explanatory diagram showing a screen displayed on an operation terminal during moving processing.
Figure 12:
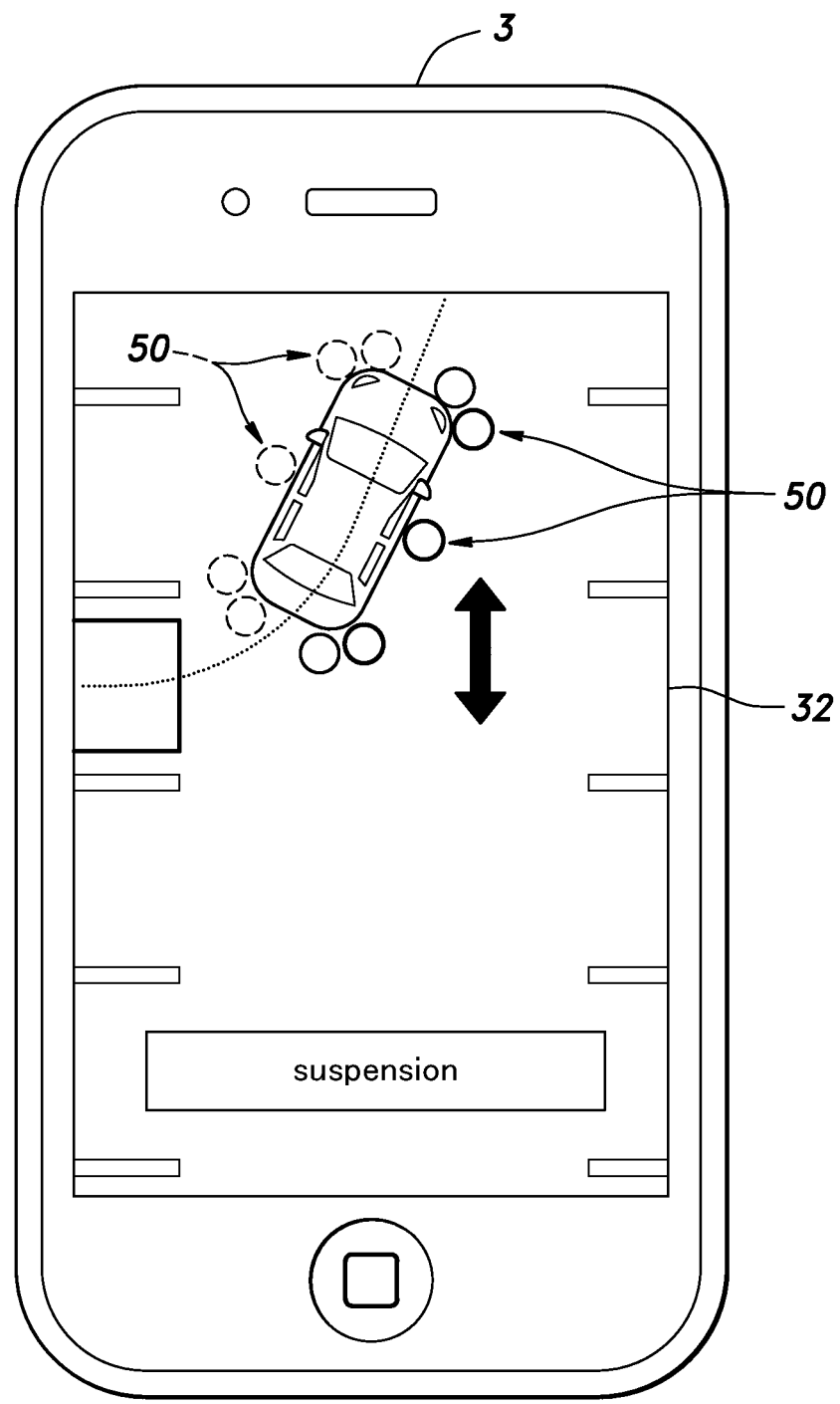
FIG. 12 is an explanatory diagram showing a first modification of the screen displayed on the operation terminal during the moving processing.

When the terminal device 3 receives the intensity signal, the processing unit 35 causes the input/output unit 32 to display the intensity of the ranging signal received by each ranging unit 21. More specifically, the processing unit 35 causes the input/output unit 32 to display an image of the vehicle S and icons 50. Each icon 50 is displayed at a position corresponding to each ranging unit 21 so as to indicate the intensity of the ranging signal received by each ranging unit 21. For example, each icon 50 may indicate the intensity of the ranging signal by the number of arcs (see FIG. 11). At this time, the number or the thickness of the arcs may increase as the intensity of the ranging signal increases. Alternatively, the intensity of the ranging signal may be indicated by the color, the light and shade, or the thickness of circles (first modification; see FIG. 12). At this time, the color of the circles may become darker or the thickness of the circles may become greater as the intensity of the ranging signal increases.

The icon 50 displayed on the operation terminal 3 is not limited to these embodiments. For example, the icon 50 may indicate the quality of a ranging state of each ranging unit 21. At this time, the icon 50 may indicate the quality of the ranging state of each ranging unit 21 by the number of bars (second modification; see FIG. 13A), by the number of arcs (third modification; see FIG. 13B), or by the length of an indicator (fourth modification; see FIG. 13C).

For example, the quality of the ranging state may be evaluated based on an average value of the intensity of all the ranging signals received by the ranging units 21, the second highest intensity of the ranging signals received by the ranging units 21, the number of the ranging units 21 whose intensity of the ranging signal is equal to or greater than the intensity threshold $I_{th}$. Further, in a case where plural distances from the operation terminal 3 to the vehicle S are acquired by using the ranging units 21, the quality of the ranging state may be evaluated based on the variation (for example, variance) in the acquired distances.

As shown in FIG. 14, the icon 50 may indicate the quality of the ranging state at three levels of "high", "medium", and "low". For example, in a case where the intensity of the ranging signal received by at least two ranging units 21 is equal to or greater than the intensity threshold $I_{th}$, an icon 50 indicating the quality "high" may be displayed. In a case where the intensity of the ranging signal received by only one reception unit 21 is equal to or greater than the intensity threshold $I_{th}$, an icon 50 indicating the quality "medium" may be displayed. In a case where the intensity of the ranging signal received by no reception unit 21 is equal to or greater than the intensity threshold $I_{th}$, the icon 50 indicating the quality "low" may be displayed.

Next, the action plan unit 43 determines whether the intensity of the ranging signal received by at least two ranging units 21 other than the failed ranging unit 21 is equal to or greater than the intensity threshold $I_{th}$ (ST13). In a case where the action plan unit 43 determines that the intensity of the ranging signal received by at least two ranging units 21 is equal to or greater than the intensity threshold $I_{th}$, the action plan unit 43 executes ranging processing to calculate the distance from the operation terminal 3 to the vehicle S (more specifically, the distance from the operation terminal 3 to the vehicle S in a horizontal plane) (ST14). Accordingly, the action plan unit 43 acquires the distance from the operation terminal 3 to the vehicle S and the direction of the operation terminal 3 with respect to the vehicle S.

In a case where the action plan unit 43 determines that the intensity of the ranging signal received by at least two ranging units 21 is not equal to or greater than the intensity threshold $I_{th}$, the action plan unit 43 transmits an intensity warning signal to the operation terminal 3 so as to cause the input/output unit 32 of the operation terminal 3 to display a notification to indicate that the intensity of the ranging signal received by at least two ranging units 21 is not equal to or greater than the intensity threshold $I_{th}$ (ST15). For example, at this time, the input/output unit 32 of the operation terminal 3 displays a notification that prompts the user to approach the vehicle S. After that, the action plan unit 43 waits until the intensity of the ranging signal received by at least two ranging units 21 becomes equal to or greater than the intensity threshold $I_{th}$.

When the ranging processing is completed, the action plan unit 43 determines whether the calculated distance from the operation terminal 3 to the vehicle S is equal to or less than the distance threshold $D_{th}$ (ST16). In a case where the distance from the operation terminal 3 to the vehicle S is equal to or less than the distance threshold $D_{th}$, the action plan unit 43 determines that the operation terminal 3 is present in a position suitable for the movement of the vehicle S, and thus ends the terminal position determination processing.

In a case where the distance from the operation terminal 3 to the vehicle S is greater than the distance threshold $D_{th}$, the action plan unit 43 prohibits the movement of the vehicle S and transmits a distance warning signal (a signal to notify the user that the movement of the vehicle S is prohibited) to the operation terminal 3, and waits until the distance from the operation terminal 3 to the vehicle S becomes equal to or less than the distance threshold $D_{th}$ (ST17). When the operation terminal 3 receives the distance warning signal, the input/output unit 32 (touch panel) of the operation terminal 3 displays a notification to indicate that the distance from the operation terminal 3 to the vehicle S is long and thus the movement of the vehicle S is prohibited.

In the present embodiment, in a case where the distance from the operation terminal 3 to the vehicle S is greater than the distance threshold $D_{th}$, the action plan unit 43 calculates the stably ranging areas Z (the areas where the distance between the operation terminal 3 and the vehicle S can be stably acquired) based on the position of the vehicle S and thus transmits the stably ranging areas Z to the operation terminal 3. At this time, in a case where any ranging units 21 fail, the action plan unit 43 determines the stably ranging areas Z based on the position of the failed ranging unit 21. As shown in FIG. 15, the processing unit 35 causes the input/output unit 32 to display the stably ranging areas Z together with the image of the vehicle S, the icons 50, and a notification to prompt the user to move to the stably ranging areas Z. FIG. 15 shows a case where the ranging units 21 provided on the left surface of the vehicle body B fail. In FIG. 15, the stably ranging areas Z are colored (dotted). In this way, by displaying the stably ranging areas Z on the input/output unit 32 of the operation terminal 3, the user can recognize the stably ranging areas Z. Accordingly, the user can move to the stably ranging areas Z while holding the operation terminal 3, and thus can start moving the vehicle S and complete the remote parking more quickly.

<The Ranging Processing>

Next, with reference to FIG. 16, the details of the ranging processing will be described. On starting the ranging processing, the action plan unit 43 acquires the arrival angle θ of the ranging signal from each ranging unit 21 whose intensity of the ranging signal is equal to or greater than the intensity threshold $I_{th}$ (ST21).

On acquiring the arrival angle θ, the action plan unit 43 refers to the correction table, and thus acquires the correction angle ε of the corresponding ranging unit 21 (ST22). After that, the action plan unit 43 corrects the arrival angle θ by using the correction angle ε, and thus calculates (acquires) the arrival angle correction value θ* (the arrival angle θ to be detected by each ranging unit 21 at the time of shipment from the factory, namely, at the time when each ranging unit 21 is in the reference posture). For example, as shown in FIGS. 6A and 6B, the action plan unit 43 calculates the arrival angle correction value θ* by adding the correction angle ε to the arrival angle θ acquired by each ranging unit 21 provided on the front surface of the vehicle body B. The action plan unit 43 calculates the arrival angle correction value θ* for each ranging unit 21 whose intensity of the ranging signal is equal to or greater than the intensity threshold $I_{th}$ (ST23).

When the calculation of the arrival angle correction value θ* is completed, the action plan unit 43 acquires the corresponding reference position P and the corresponding reference angle δ set for each ranging unit 21 whose intensity of the ranging signal is equal to or greater than the intensity threshold $I_{th}$ by referring to the reference table stored in the storage unit 45 (ST24).

After that, the action plan unit 43 acquires the outline information (the information about the outline of the vehicle body B) stored in the storage unit 45. After that, the action plan unit 43 calculates (acquires) the distance from the operation terminal 3 to the vehicle S (more specifically, the distance from the operation terminal 3 to the outer surface of the vehicle S) based on the so-called trigonometry by using the reference position P, the reference angle δ, and the arrival angle correction value θ* of at least two ranging units 21 and the outline information (ST25).

More specifically, for example, in a case where two ranging units 21 provided at the both lateral ends on the front surface of the vehicle body B acquires the ranging signal whose intensity is equal to or greater than the intensity threshold $I_{th}$, the action plan unit 43 first acquires the distance $D_1$ between the two ranging units 21. Next, as shown in FIG. 6A, the action plan unit 43 calculates the fore and aft distance $D_2$ between the ranging units 21 provided on the front surface of the vehicle body B and the operation terminal 3 based on the so-called trigonometry by using the distance $D_1$ between the ranging units 21 and the arrival angle correction values $\theta^*_1$, and $\theta^*_2$ of each ranging unit 21. After that, the action plan unit 43 selects (identifies) a closest part C (a part closest to the operation terminal 3) of the vehicle body B by using the outline information, and thus acquires the distance $D_3$ from the operation terminal 3 to the closest part C of the vehicle body B (namely, the distance from the operation terminal 3 to the vehicle S).

On acquiring the distance from the operation terminal 3 to the vehicle S, the action plan unit 43 ends the ranging processing.

Next, operations and effects of the remote parking system 1 according to the present embodiment will be described. On determining that all the ranging units 21 are normally operating (namely, all the ranging units 21 do not fail) and thus the remote parking can be executed, the action plan unit 43 continuously executes the terminal position determination processing at predetermined time intervals until the vehicle S moves to the parking position. In the terminal position determination processing, the action plan unit 43 acquires the distance from the operation terminal 3 to the vehicle S based on the arrival angle θ of the ranging signal detected by at least two ranging units 21, the reference position P and the reference angle δ set for each ranging unit 21, and the correction angle c calculated for each ranging unit 21. Next, the action plan unit 43 determines whether the distance from the operation terminal 3 to the vehicle S is equal to or less than the distance threshold $D_{th}$. In a case where the action plan unit 43 determines that the distance is equal to or less than the distance threshold $D_{th}$, the action plan unit 43 moves the vehicle S to the parking position based on the operation input to the operation terminal 3.

In the terminal position determination processing, the action plan unit 43 acquires the intensity of the ranging signal acquired by each ranging unit 21, and thus transmits the intensity of the ranging signal, together with the reference position P of each ranging unit 21, to the operation terminal 3. When the operation terminal 3 receives the reference position P of each ranging unit 21 and the intensity of the ranging signal, the input/output unit 32 (touch panel) displays the intensity of the ranging signal at the position corresponding to each ranging unit 21 by using the icons 50 (see FIGS. 11 and 12).

Accordingly, the user can recognize the intensity of the ranging signal received by each ranging unit 21 based on the screen of the operation terminal 3. Thus, the user can move the operation terminal 3 while checking the intensity of the received ranging signal based on the screen of the operation terminal 3. Accordingly, the user can easily move the operation terminal 3 to a place where the intensity of the ranging signal is high (namely, to a place where the communication between the operation terminal 3 and each ranging unit 21 is stable and thus the distance is easily measured).

Further, in the present embodiment (see FIG. 11) and the first modification (see FIG. 12), the icons 50 to indicate the intensity of the ranging signal is displayed on the screen of the operation terminal 3 at the position corresponding to each ranging unit 21 of the vehicle S. Accordingly, the user can recognize the position of each ranging unit 21 whose intensity of the ranging signal is low on the screen of the operation terminal 3. Thus, the user can increase the intensity of the ranging signal by approaching each ranging unit 21 whose intensity of ranging signal is low. Accordingly, the user can easily enhance the stability of the communication between the operation terminal 3 and each ranging unit 21 to measure the distance from the operation terminal 3 to each ranging unit 21.

In the terminal position determination processing, the action plan unit 43 determines whether the intensity of the ranging signal received (acquired) by at least two ranging units 21 is equal to or greater than the intensity threshold $I_{th}$. When the intensity of the ranging signal received (acquired) by at least two ranging units 21 is equal to or greater than the intensity threshold $I_{th}$ (Yes in ST13), the action plan unit 43 acquires the distance from the operation terminal 3 to the vehicle S by using the arrival angle correction value $\theta^*$ acquired by at least two ranging units 21 (ST14). After that, the vehicle S moves on condition that the distance from the operation terminal 3 to the vehicle S is equal to or less than the distance threshold $D_{th}$ (ST16). The distance from the operation terminal 3 to the vehicle S can be calculated based on the trigonometry by using the arrival angle correction value $\theta^*$ acquired by at least two ranging units 21. Accordingly, the distance from the operation terminal 3 to the vehicle S can be calculated accurately.

In a case where the intensity of the ranging signal received by at least two ranging units 21 is not equal to or greater than the intensity threshold $I_{th}$ (No in ST13), the action plan unit 43 causes the operation terminal 3 to display such a determination result (ST15), and waits until the intensity of the ranging signal received by at least two ranging units 21 becomes equal to or greater than the intensity threshold $I_{th}$. After that, when the intensity of the ranging signal received by at least two ranging units 21 becomes equal to or greater than the intensity threshold $I_{th}$ (Yes in ST13), the vehicle S moves on condition that the distance from the operation terminal 3 to the vehicle S is equal to or less than the distance threshold $D_{th}$ (ST16).

Thus, even in a case where the intensity of the ranging signal received by less than two ranging units 21 is equal to or greater than the intensity threshold $I_{th}$, the action plan unit 43 waits until the intensity of the ranging signal received by at least two ranging units 21 becomes equal to or greater than the intensity threshold $I_{th}$. After that, when the intensity of the ranging signal received by at least two ranging units 21 becomes equal to or greater than the intensity threshold $I_{th}$, the movement of the vehicle S is resumed. Accordingly, the convenience of the remote parking system 1 can be improved as compared with a case where the remote parking is canceled when the intensity of the ranging signal received by less than two ranging units 21 is equal to or greater than the intensity threshold $I_{th}$.

Concrete embodiments of the present invention have been described in the foregoing, but the present invention should not be limited by the foregoing embodiments and various modifications and alterations are possible within the scope of the present invention. As shown in FIG. 17, when the vehicle S is present at the estimated position (see the two-dot chain line) just before the moving processing is executed, the action plan unit 43 may calculate areas where the normally operating ranging units 21 stably measure the distance (hereinafter referred to as "recommended areas $Z^*$"), transmit a signal including the recommended areas $Z^*$ to the operation terminal 3, and cause the operation terminal 3 to display the recommended areas $Z^*$. FIG. 17 shows an example of the screen displayed on the operation terminal 3 at this time. In FIG. 17, colored areas (dotted areas) correspond to the recommended areas $Z^*$. Further, the action plan unit 43 may determine whether the operation terminal 3 is present in the recommended areas $Z^*$ based on the distance from the operation terminal 3 to the vehicle S and the direction of the operation terminal 3 with respect to the vehicle S, and cause the operation terminal 3 to display a notification to prompt the movement to the recommended areas $Z^*$ in a case where the operation terminal 3 is not present in the recommended areas $Z^*$.

In the above embodiment, the distance from the operation terminal 3 to the vehicle S is determined based on the distance between the closest part C of the vehicle body B and the operation terminal 3. However, the present invention is not limited to this embodiment. In another embodiment, the distance from the operation terminal 3 to the vehicle S may be determined based on the distance between the operation terminal 3 and one of the ranging units 21 closest to the operation terminal 3. Accordingly, it is not necessary to store the outline information of the vehicle body B in the storage unit 45, so that the distance from the operation terminal 3 to the vehicle S can be acquired more simply.

In the above embodiment, the notification device 14 includes the headlights 30, and the action plan unit 43 blinks the headlights 30 when the vehicle S is approaching the user. However, the present invention is not limited to this embodiment. In another embodiment, when the vehicle S is approaching the user, the action plan unit 43 may blink or turn on any lights other than the headlights 30 (for example, tail lights) which are mounted on the vehicle S so as to emit light to the outside of the vehicle S.

In the above embodiment, the notification device 14 includes the horn unit 31, and the action plan unit 43 activates the horn unit 31 when the vehicle S is approaching the user. However, the present invention is not limited to this embodiment. In another embodiment, the notification device 14 may include the sound device other than the horn unit 31 (for example, a buzzer that generates a sound when the automatic parking is executed) that can generate a sound. In such an embodiment, the action plan unit 43 may cause the sound device to generate a sound when the vehicle S is approaching the user.

In the above embodiment, the remote parking system 1 measures the distance according to the ranging signal based on Bluetooth. However, the present invention is not limited to this embodiment. In another embodiment, the remote parking system 1 may measure the distance by using radio waves based on a Wi-fi standard or radio waves used in an ultra-wideband wireless system (or an ultra-highspeed wireless system) as the ranging signal.

In the above embodiment, the remote parking system 1 measures the distance based on the angle of the signal received by the two antennas 23 of each ranging unit 21. However, the present invention is not limited to this embodiment. In another embodiment, the remote parking system 1 may measure the distance based on a period from a time when a radio signal transmitted from the operation terminal 3 to a time when the radio signal arriving at the antenna 23 of each ranging unit 21, or based on a period from the time when the radio signal transmitted from the antenna 23 of each ranging unit 21 to a time when the radio signal arriving at the operation terminal 3.

In the above embodiment, the reference posture is set based on the direction of the reception surface 22S at the time of shipment from the factory. However, the present invention is not limited to this embodiment. In another embodiment, the reference posture may be set based on the direction of the reception surface 22S at a time when the vehicle S is designed, and the reference angle δ may be a prescribed value set at the time when the vehicle S is designed. In still another embodiment, the reference posture may be set based on the direction of the reception surface 22S at a time when the maintenance of the vehicle S is completed in a maintenance factory or the like, and the reference angle δ may be a value measured at the time when the maintenance of the vehicle S is completed in the maintenance factory or the like.

The invention claimed is:

1. A remote parking system for parking a vehicle at a prescribed parking position by a remote operation, comprising:
   a terminal configured to be carried by a user, to accept an operation input by the user, and to transmit a ranging signal for measuring a distance from the terminal to the vehicle;
   plural reception units attached to an outer edge of the vehicle with a reference posture, provided with a reception surface to receive the ranging signal from the terminal, and configured to detect an arrival direction of the ranging signal with respect to the reception surface; and
   a control device configured to acquire the distance from the terminal to the vehicle based on the arrival direction of the ranging signal detected by at least two of the reception units and the reference posture of each of the reception units, and to move the vehicle toward the parking position based on the operation input to the terminal in a case where the control device determines that the acquired distance from the terminal to the vehicle is equal to or less than a prescribed threshold,
   wherein the control device is configured to cause the terminal to display an intensity of the ranging signal received by at least one of the reception units,
   in a case where the intensity of the ranging signal received by at least two of the reception units is not equal to or greater than a prescribed intensity threshold, the control device waits until the intensity of the ranging signal received by at least two of the reception units becomes equal to or greater than the prescribed intensity threshold,
   when the intensity of the ranging signal received by at least two of the reception units becomes equal to or greater than the prescribed intensity threshold, the control device permits a movement of the vehicle toward the parking position, and
   the control device is configured to acquire a direction of the terminal with respect to the vehicle and the distance from the terminal to the vehicle based on the ranging signal received by each of the reception units, to calculate a moving distance of the vehicle based on an amount of a swiping operation of the operation input to the terminal, and to stop the vehicle and cause the terminal to display a warning in a case where the terminal is present in a moving direction of the vehicle and the distance from the terminal to the vehicle is equal to or less than the moving distance.

2. The remote parking system according to claim 1, wherein the control device is configured to cause the terminal to display a position of the at least one of the reception units and the intensity of the ranging signal received by the at least one of the reception units.

3. The remote parking system according to claim 1, wherein the control device is configured to estimate a position of the vehicle after the movement of the vehicle based on the operation input to the terminal, and to cause the terminal to display an area where the ranging signal from the terminal can be received at the position of the vehicle after the movement of the vehicle.

4. A remote parking system for parking a vehicle at a prescribed parking position by a remote operation, comprising:
   a terminal configured to be carried by a user, to accept an operation input by the user, and to transmit a ranging signal for measuring a distance from the terminal to the vehicle;
   plural reception units attached to an outer edge of the vehicle with a reference posture, provided with a reception surface to receive the ranging signal from the terminal, and configured to detect an arrival direction of the ranging signal with respect to the reception surface; and
   a control device configured to acquire the distance from the terminal to the vehicle based on the arrival direction of the ranging signal detected by at least two of the reception units and the reference posture of each of the reception units, and to move the vehicle toward the parking position based on the operation input to the terminal in a case where the control device determines that the acquired distance from the terminal to the vehicle is equal to or less than a prescribed threshold,
   wherein the control device is configured to cause the terminal to display an intensity of the ranging signal received by at least one of the reception units,
   in a case where the intensity of the ranging signal received by at least two of the reception units is not equal to or greater than a prescribed intensity threshold, the control device waits until the intensity of the ranging signal received by at least two of the reception units becomes equal to or greater than the prescribed intensity threshold,
   when the intensity of the ranging signal received by at least two of the reception units becomes equal to or greater than the prescribed intensity threshold, the control device permits a movement of the vehicle toward the parking position, the vehicle includes a notification device configured to give a notification to an outside of the vehicle by at least one of a sound and light, and the control device is configured to acquire a direction of the terminal with respect to the vehicle and the distance from the terminal to the vehicle based on the ranging signal received by each of the reception units, to calculate a moving distance of the vehicle based on an amount of a swiping operation of the operation input to the terminal, and to stop the vehicle and activate the notification device in a case where the terminal is present in a moving direction of the vehicle and the distance from the terminal to the vehicle is equal to or less than the moving distance.

5. The remote parking system according to claim 4, wherein the notification device includes at least one of a light and a sound device.

* * * * *